(12) United States Patent
Branecky

(10) Patent No.: US 8,177,519 B2
(45) Date of Patent: May 15, 2012

(54) CONTROLLER FOR A MOTOR AND A METHOD OF CONTROLLING THE MOTOR

(75) Inventor: Brian Thomas Branecky, Oconomowoc, WI (US)

(73) Assignee: Regal Beloit EPC Inc., Beloit, WI (US)

( * ) Notice: Subject to any disclaimer, the term of this patent is extended or adjusted under 35 U.S.C. 154(b) by 79 days.

(21) Appl. No.: 12/506,372

(22) Filed: Jul. 21, 2009

(65) Prior Publication Data
US 2009/0280014 A1  Nov. 12, 2009

Related U.S. Application Data

(62) Division of application No. 11/549,518, filed on Oct. 13, 2006.

(51) Int. Cl.
*F04B 49/06* (2006.01)
(52) U.S. Cl. .................... 417/44.11; 417/53
(58) Field of Classification Search ............ 417/20, 417/44.11, 43, 44.1, 44.2, 45, 53
See application file for complete search history.

(56) References Cited

U.S. PATENT DOCUMENTS

| | | | |
|---|---|---|---|
| 1,061,919 A | 5/1913 | Miller | |
| 2,767,277 A | 10/1956 | Wirth | |
| 3,191,935 A | 6/1965 | Uecker | |
| 3,558,910 A | 1/1971 | Dale et al. | |
| 3,781,925 A | 1/1974 | Curtis et al. | |
| 3,838,597 A | 10/1974 | Montgomery | |
| 3,953,777 A | 4/1976 | McKee | |
| 3,963,375 A | 6/1976 | Curtis | |
| 4,021,700 A | 5/1977 | Ellis-Anwyl | |
| 4,168,413 A | 9/1979 | Halpine | |
| 4,185,187 A | 1/1980 | Rogers | |
| 4,319,712 A | 3/1982 | Bar | |
| 4,370,098 A | 1/1983 | McClain et al. | |

(Continued)

FOREIGN PATENT DOCUMENTS

DE  2946049  5/1981

(Continued)

OTHER PUBLICATIONS

Joe Cohen; signed letter to Sheldon L. Wolfe; 1 page.

(Continued)

*Primary Examiner* — Devon C Kramer
*Assistant Examiner* — Bryan Lettman
(74) *Attorney, Agent, or Firm* — Michael Best & Friedrich LLP

(57) ABSTRACT

A pumping apparatus for a jetted-fluid system includes a pump having an inlet connectable to the drain, and an outlet connectable to the return. The pump is adapted to receive the fluid from the drain and jet fluid through the return. The apparatus includes a motor coupled to the pump to operate the pump, a sensor configured to generate a signal having a relation to a parameter of the motor, and a switch coupled to the motor and configured to control at least a characteristic of the motor. The apparatus also includes a microcontroller coupled to the sensor and the switch. The microcontroller includes a model observer configured to receive a first value based on the signal and to generate a second value representative of at least one of a modeled flow or a modeled pressure based on the first value. The microcontroller is configured to control the motor based on the second value.

8 Claims, 14 Drawing Sheets

U.S. PATENT DOCUMENTS

| | | |
|---|---|---|
| 4,371,315 A | 2/1983 | Shikasho |
| 4,420,787 A | 12/1983 | Tibbits et al. |
| 4,428,434 A | 1/1984 | Gelaude |
| 4,449,260 A | 5/1984 | Whitaker |
| 4,473,338 A | 9/1984 | Garmong |
| 4,504,773 A | 3/1985 | Suzuki et al. |
| 4,505,643 A | 3/1985 | Millis et al. |
| 4,514,989 A | 5/1985 | Mount |
| 4,541,029 A | 9/1985 | Ohyama |
| 4,581,900 A | 4/1986 | Lowe et al. |
| 4,620,835 A | 11/1986 | Bell |
| 4,647,825 A | 3/1987 | Profio et al. |
| 4,676,914 A | 6/1987 | Millis et al. |
| 4,678,404 A | 7/1987 | Lorett et al. |
| 4,695,779 A | 9/1987 | Yates |
| 4,697,464 A | 10/1987 | Martin |
| 4,703,387 A | 10/1987 | Miller |
| 4,758,697 A | 7/1988 | Jeuneu |
| 4,837,656 A | 6/1989 | Barnes |
| 4,839,571 A | 6/1989 | Farnham et al. |
| 4,841,404 A | 6/1989 | Marshall et al. |
| 4,864,287 A | 9/1989 | Kierstead |
| 4,885,655 A | 12/1989 | Springer et al. |
| 4,896,101 A | 1/1990 | Cobb |
| 4,907,610 A | 3/1990 | Meincke |
| 4,971,522 A | 11/1990 | Butlin |
| 4,996,646 A | 2/1991 | Farrington |
| 4,998,097 A | 3/1991 | Noth et al. |
| 5,079,784 A | 1/1992 | Rist et al. |
| 5,100,298 A | 3/1992 | Shibata et al. |
| RE33,874 E | 4/1992 | Miller |
| 5,167,041 A | 12/1992 | Burkitt, III |
| 5,172,089 A | 12/1992 | Wright et al. |
| 5,234,286 A | 8/1993 | Wagner |
| 5,255,148 A | 10/1993 | Yeh |
| 5,324,170 A | 6/1994 | Anastos et al. |
| 5,347,664 A | 9/1994 | Hamza et al. |
| 5,361,215 A | 11/1994 | Tompkins et al. |
| 5,422,014 A | 6/1995 | Allen et al. |
| 5,473,497 A | 12/1995 | Beatty |
| 5,545,012 A | 8/1996 | Anastos et al. |
| 5,548,854 A | 8/1996 | Bloemer et al. |
| 5,550,753 A | 8/1996 | Tompkins et al. |
| 5,559,720 A | 9/1996 | Tompkins et al. |
| 5,570,481 A | 11/1996 | Mathis et al. |
| 5,577,890 A | 11/1996 | Nielsen et al. |
| 5,601,413 A | 2/1997 | Langley et al. |
| 5,624,237 A | 4/1997 | Prescott et al. |
| 5,632,468 A | 5/1997 | Schoenmeyr |
| 5,633,540 A | 5/1997 | Moan |
| 5,690,476 A | 11/1997 | Miller |
| 5,727,933 A | 3/1998 | Laskaris et al. |
| 5,777,833 A | 7/1998 | Romillon |
| 5,820,350 A | 10/1998 | Mantey et al. |
| 5,833,437 A | 11/1998 | Kurth et al. |
| 5,907,281 A | 5/1999 | Miller, Jr. et al. |
| 5,930,092 A | 7/1999 | Nystrom |
| 5,947,700 A | 9/1999 | McKain et al. |
| 5,959,534 A | 9/1999 | Campbell et al. |
| 6,043,461 A | 3/2000 | Holling et al. |
| 6,045,333 A | 4/2000 | Breit |
| 6,059,536 A | 5/2000 | Stingl |
| 6,092,992 A | 7/2000 | Imblum et al. |
| 6,157,304 A | 12/2000 | Bennett et al. |
| 6,171,073 B1 | 1/2001 | McKain et al. |
| 6,199,224 B1 | 3/2001 | Versland |
| 6,213,724 B1 | 4/2001 | Haugen et al. |
| 6,216,814 B1 | 4/2001 | Fujita et al. |
| 6,227,808 B1 | 5/2001 | McDonough |
| 6,238,188 B1 | 5/2001 | Lifson |
| 6,247,429 B1 | 6/2001 | Hara et al. |
| 6,253,227 B1 | 6/2001 | Tompkins et al. |
| 6,342,841 B1 | 1/2002 | Stingl |
| 6,354,805 B1 | 3/2002 | Moller |
| 6,364,621 B1 | 4/2002 | Yamauchi |
| 6,390,781 B1 * | 5/2002 | McDonough ............... 417/44.2 |
| 6,468,042 B2 | 10/2002 | Moller |
| 6,468,052 B2 | 10/2002 | McKain et al. |
| 6,481,973 B1 | 11/2002 | Struthers |
| 6,501,629 B1 | 12/2002 | Marriott |
| 6,504,338 B1 | 1/2003 | Eichon |
| 6,522,034 B1 | 2/2003 | Nakayama |
| 6,534,940 B2 | 3/2003 | Bell et al. |
| 6,534,947 B2 | 3/2003 | Johnson et al. |
| 6,543,940 B2 | 4/2003 | Chu |
| 6,590,188 B2 | 7/2003 | Cline et al. |
| 6,595,762 B2 | 7/2003 | Khanwilkar et al. |
| 6,616,413 B2 | 9/2003 | Humphries |
| 6,623,245 B2 | 9/2003 | Meza et al. |
| 6,636,135 B1 | 10/2003 | Vetter |
| 6,638,023 B2 | 10/2003 | Scott |
| 6,676,831 B2 | 1/2004 | Wolfe |
| 6,696,676 B1 | 2/2004 | Graves et al. |
| 6,709,240 B1 | 3/2004 | Schmalz et al. |
| 6,715,996 B2 | 4/2004 | Moeller |
| 6,732,387 B1 | 5/2004 | Waldron |
| 6,768,279 B1 | 7/2004 | Skinner et al. |
| 6,806,677 B2 | 10/2004 | Kelly et al. |
| 6,875,961 B1 | 4/2005 | Collins |
| 6,895,608 B2 | 5/2005 | Goettl |
| 6,933,693 B2 | 8/2005 | Schuchmann |
| 6,941,785 B2 | 9/2005 | Haynes et al. |
| 6,965,815 B1 | 11/2005 | Tompkins et al. |
| 6,976,052 B2 | 12/2005 | Tompkins et al. |
| 7,055,189 B2 | 6/2006 | Goettl |
| 7,089,606 B2 | 8/2006 | Goettl |
| 7,117,120 B2 | 10/2006 | Beck et al. |
| 7,163,380 B2 | 1/2007 | Jones |
| 7,213,275 B2 | 5/2007 | Goettl |
| 7,327,275 B2 | 2/2008 | Brochu et al. |
| 7,417,834 B2 | 8/2008 | Cline et al. |
| 2001/0029407 A1 | 10/2001 | Tompkins et al. |
| 2002/0176783 A1 | 11/2002 | Moeller |
| 2002/0190687 A1 | 12/2002 | Bell et al. |
| 2003/0106147 A1 | 6/2003 | Cohen et al. |
| 2004/0009075 A1 | 1/2004 | Meza et al. |
| 2004/0062658 A1 * | 4/2004 | Beck et al. ................ 417/42 |
| 2004/0090197 A1 | 5/2004 | Schuchmann |
| 2004/0205886 A1 | 10/2004 | Goettl |
| 2004/0213676 A1 | 10/2004 | Phillips |
| 2005/0097665 A1 | 5/2005 | Goettl |
| 2005/0123408 A1 | 6/2005 | Koehl |
| 2005/0133088 A1 | 6/2005 | Bologeorges |
| 2005/0158177 A1 | 7/2005 | Mehlhorn |
| 2005/0193485 A1 | 9/2005 | Wolfe |
| 2005/0226731 A1 | 10/2005 | Mehlhorn |
| 2005/0281681 A1 | 12/2005 | Anderson et al. |
| 2006/0045750 A1 | 3/2006 | Stiles |
| 2006/0090255 A1 | 5/2006 | Cohen |
| 2006/0101571 A1 | 5/2006 | Goettl |
| 2006/0107453 A1 | 5/2006 | Goettl |
| 2006/0127227 A1 | 6/2006 | Mehlhorn |
| 2006/0146462 A1 | 7/2006 | McMillian, IV |
| 2006/0238931 A1 | 10/2006 | Cline et al. |
| 2006/0242757 A1 | 11/2006 | Goettl |
| 2007/0056955 A1 | 3/2007 | Maddox |
| 2007/0056956 A1 | 3/2007 | Maddox |
| 2007/0058313 A1 | 3/2007 | Maddox |
| 2007/0058314 A1 | 3/2007 | Maddox |
| 2007/0058315 A1 | 3/2007 | Maddox |
| 2007/0061051 A1 | 3/2007 | Maddox |
| 2007/0114162 A1 | 5/2007 | Stiles, Jr. et al. |
| 2007/0154319 A1 | 7/2007 | Stiles, Jr. et al. |
| 2007/0154320 A1 | 7/2007 | Stiles, Jr. et al. |
| 2007/0154321 A1 | 7/2007 | Stiles, Jr. et al. |
| 2007/0154322 A1 | 7/2007 | Stiles, Jr. et al. |
| 2007/0154323 A1 | 7/2007 | Stiles, Jr. et al. |
| 2007/0160480 A1 | 7/2007 | Ruffo |
| 2007/0163929 A1 | 7/2007 | Stiles, Jr. et al. |
| 2007/0177985 A1 | 8/2007 | Walls et al. |
| 2007/0183902 A1 | 8/2007 | Stiles, Jr. et al. |
| 2007/0258827 A1 | 11/2007 | Gierke |
| 2008/0003114 A1 | 1/2008 | Levin et al. |
| 2008/0041839 A1 | 2/2008 | Tran |
| 2008/0063535 A1 | 3/2008 | Koehl |
| 2008/0095638 A1 | 4/2008 | Branecky |
| 2008/0095639 A1 | 4/2008 | Bartos |

| | | | |
|---|---|---|---|
| 2008/0095640 | A1 | 4/2008 | Branecky |
| 2008/0168599 | A1 | 7/2008 | Caudill et al. |
| 2009/0035151 | A1 | 2/2009 | Sugiura et al. |
| 2009/0288407 | A1 | 11/2009 | Bartos |
| 2009/0290989 | A1 | 11/2009 | Mehlhorn |
| 2009/0290990 | A1 | 11/2009 | Branecky |
| 2009/0290991 | A1 | 11/2009 | Mehlhorn |
| 2010/0068073 | A1 | 3/2010 | Branecky |
| 2010/0080714 | A1 | 4/2010 | Mehlhorn |
| 2010/0232981 | A1 | 9/2010 | Branecky et al. |
| 2011/0002792 | A1 | 1/2011 | Bartos et al. |

FOREIGN PATENT DOCUMENTS

| | | |
|---|---|---|
| DE | 19736079 | 2/1999 |
| EP | 0150068 | 7/1985 |
| EP | 0226858 | 7/1987 |
| EP | 0246769 | 11/1987 |
| EP | 0833436 | 4/1998 |
| EP | 1585205 | 10/2005 |
| JP | 355072678 | 5/1980 |
| WO | WO 2005/111473 | 11/2005 |
| WO | 2010/039580 | 4/2010 |

OTHER PUBLICATIONS

Sta-Rite Industries, Inc.; Facsimile; 1 page.
Fail-Safe, LLC and Sta-Rite Industries, Inc.; Non-Disclosure Agreement; 2 pages.
Author unknown; Safety Vacuum Release Valve from Fail Safe; 1 page.
Author unknown; Request for Lab Project; 3 pages.
Joe Cohen; signed letter to Gary Brooks; 1 page.
Author unknown; "Suction Safe" Swimming Pool Pump: Simulated Field-test; 3 pages.
Author unknown; General Worksheet: Fail-Safe Vacuum Release Valve W/ Franklin 2.6 hp "Load Tech" motor on Vinyl Liner Pool; 3 pages.
Richard Meyer; Orifices for Fail-Safe assembly, 1 page.
Failsafe, LLC, Save Lives! Use Fail-Safe Suction-Safe Pool & Spa Pumps, brochure (Dec. 31, 2000), 4 pages, Aurora, Colorado.
Failsafe, LLC, Suction-Safe Pool & Spa Pump Operator's Manual, brochure (Apr. 8, 2003) 12 pages, Aurora, Colorado.
STA-Rite Industries, Inc., "60 Cycle 'C' and 'CC' Series Centrifugal Pumps for Swimming Pool Use—Owner's Manual," S408 (Dec. 10, 2002) 16 pages).
Extended Search Report of the European Patent Office for Application No. 07118064.0 dated Feb. 28, 2008, 11 pages.
European Patent Office Examination Report for Application No. 07118064.0 dated Sep. 22, 2008 (7 pages).
United States Patent Office Action for U.S. Appl. No. 11/549,537 dated Feb. 9, 2009 (22 pages).
United States Patent Office Action for U.S. Appl. No. 11/549,518 dated Apr. 2, 2009 (9 pages).
United States Patent Office Action for U.S. Appl. No. 11/549,518 dated Dec. 4, 2009 (9 pages).
United States Patent Office Action for U.S. Appl. No. 11/549,499 dated Apr. 1, 2009 (13 pages).
United States Patent Office Action for U.S. Appl. No. 11/549,537 dated Aug. 3, 2009 (21 pages).
Notice of Allowance from United States Patent Office for U.S. Appl. No. 11/549,537 dated Dec. 15, 2009 (3 pages).
United States Patent Office Action for U.S. Appl. No. 11/549,499 dated Nov. 12, 2009 (15 pages).
European Patent Office Action for Application No. 07118064.0 dated Apr. 27, 2010 (3 pages).
United States Patent Office Action for U.S. Appl. No. 11/549,499 dated Apr. 23, 2010 (14 pages).
United States Patent Office Action for U.S. Appl. No. 11/549,518 dated Apr. 9, 2010 (12 pages).
United States Patent Office Action for U.S. Appl. No. 11/549,499 dated Nov. 1, 2010 (16 pages).
United States Patent Office Action for U.S. Appl. No. 11/549,518 dated Oct. 27, 2010 (12 pages).
European Patent Office Action for Application No. 07118126.7 dated Dec. 20, 2010 (7 pages).
United States Patent Office Action for U.S. Appl. No. 11/549,499 dated Jan. 19, 2011 (16 pages).
United States Patent Office Action for U.S. Appl. No. 11/549,518 dated Feb. 2, 2011 (10 pages).
United States Patent Office Action for U.S. Appl. No. 11/549,499 dated Aug. 26, 2011 (17 pages).
United States Patent Office Action for U.S. Appl. No. 11/549,518 dated Aug. 4, 2011 (11 pages).
European Patent Office Action for Application No. 07118126.7 dated Sep. 21, 2011 (5 pages).
United States Patent Office Action for U.S. Appl. No. 12/506,362 dated Dec. 13, 2011 (7 pages).
United States Patent Office Actino for U.S. Appl. No. 12/506,417 dated Dec. 14, 2011 (11 pages).
United States Patent Office Action for U.S. Appl. No. 11/549,518 dated Nov. 18, 2011 (23 pages).
United States Patent Office Action for U.S. Appl. No. 12/751,275 dated Feb. 1, 2012 (11 pages).

* cited by examiner

| RPM | GPM | FT | HP | kW |
|---|---|---|---|---|
| 3567.45 | 0 | 73.37 | 0.636 | 0.67 |
| 3549.82 | 20 | 73.29 | 0.998 | 0.966 |
| 3541.26 | 30 | 71.33 | 1.161 | 1.104 |
| 3534.74 | 40 | 68.2 | 1.277 | 1.205 |
| 3528.5 | 50 | 64.59 | 1.382 | 1.298 |
| 3522.5 | 60 | 60.91 | 1.477 | 1.384 |
| 3517.21 | 70 | 55.48 | 1.555 | 1.457 |
| 3513.32 | 80 | 49.1 | 1.611 | 1.509 |
| 3510.71 | 90 | 41.85 | 1.646 | 1.543 |
| 3508.61 | 100 | 33.95 | 1.674 | 1.57 |
| 3507.67 | 112.4 | 22.77 | 1.687 | 1.582 |

*FIG. 12*

CONTROLLER FOR A MOTOR AND A METHOD OF CONTROLLING THE MOTOR

CROSS REFERENCE TO RELATED APPLICATIONS

This application is a divisional of U.S. patent application Ser. No. 11/549,518, filed Oct. 13, 2006, the content of which is incorporated herein by reference in its entirety.

BACKGROUND

The invention relates to a controller for a motor, and particularly, a controller for a motor operating a pump.

Occasionally on a swimming pool, spa, or similar jetted-fluid application, the main drain can become obstructed with an object, such as a towel or pool toy. When this happens, the suction force of the pump is applied to the obstruction and the object sticks to the drain. This is called suction entrapment. If the object substantially covers the drain (such as a towel covering the drain), water is pumped out of the drain side of the pump. Eventually the pump runs dry, the seals burn out, and the pump can be damaged.

Another type of entrapment is referred to as mechanical entrapment. Mechanical entrapment occurs when an object, such as a towel or pool toy, gets tangled in the drain cover. Mechanical entrapment may also effect the operation of the pump.

Several solutions have been proposed for suction and mechanical entrapment. For example, new pool construction is required to have two drains, so that if one drain becomes plugged, the other can still flow freely and no vacuum entrapment can take place. This does not help existing pools, however, as adding a second drain to an in-ground, one-drain pool is very difficult and expensive. Modern pool drain covers are also designed such that items cannot become entwined with the cover.

As another example, several manufacturers offer systems known as Safety Vacuum Release Systems (SVRS). SVRS often contain several layers of protection to help prevent both mechanical and suction entrapment. Most SVRS use hydraulic release valves that are plumbed into the suction side of the pump. The valve is designed to release (open to the atmosphere) if the vacuum (or pressure) inside the drain pipe exceeds a set threshold, thus releasing the obstruction. These valves can be very effective at releasing the suction developed under these circumstances. Unfortunately, they have several technical problems that have limited their use.

SUMMARY

In one embodiment, the invention provides a pumping apparatus for a jetted-fluid system having a vessel for holding a fluid, a drain, and a return. The pumping apparatus is connected to a power source and includes a pump having an inlet connectable to the drain, and an outlet connectable to the return. The pump is adapted to receive the fluid from the drain and jet fluid through the return. The pumping apparatus also includes a motor coupled to the pump to operate the pump, a sensor configured to generate a signal having a relation to a parameter of the motor, and a switch coupled to the motor and configured to control at least a characteristic of the motor. The pumping apparatus also includes a microcontroller coupled to the sensor and the switch. The microcontroller includes a model observer configured to receive a first value based on the signal and to generate a second value representative of at least one of a modeled flow or a modeled pressure based on the first value. The microcontroller is configured to control the motor based on the second value.

In another embodiment, the invention provides a pumping apparatus for a jetted-fluid system having a vessel for holding a fluid, a drain, and a return. The pumping apparatus is connected to a power source and includes a pump having an inlet connectable to the drain, and an outlet connectable to the return. The pump is adapted to receive the fluid from the drain and jet fluid through the return. The pumping apparatus also includes a motor coupled to the pump to operate the pump, a sensor configured to generate a signal having a relation to a parameter of the motor, and a switch coupled to the motor and configured to control at least a characteristic of the motor. The pumping apparatus also includes a microcontroller coupled to the sensor and the switch. The microcontroller includes a model observer configured to receive a first value based on the signal and to generate a second value representative of a modeled pressure based on the first value. The microcontroller is configured to control the motor based on the second value.

In another embodiment, the invention provides a method of controlling a motor operating a pumping apparatus of a jetted fluid system having a vessel for holding a fluid, a drain, and a return. The pumping apparatus includes a pump having an inlet connectable to the drain, and an outlet connectable to the return. The pump is adapted to receive the fluid from the drain and jet fluid through the return, and the motor coupled to the pump to operate the pump. The method includes determining a power of the pump motor, applying the power to a model observer, and obtaining a value representative of a flow based on the power and the model observer. The method also includes determining whether the value indicates a condition of the pump, and controlling the motor to operate the pump based on the condition of the pump.

In another embodiment, the invention provides a method of controlling a motor operating a pumping apparatus of a jetted fluid system having a vessel for holding a fluid, a drain, and a return. The pumping apparatus includes a pump with an inlet connectable to the drain, and an outlet connectable to the return. The pump adapted to receive the fluid from the drain and jet fluid through the return, and the motor coupled to the pump to operate the pump. The method includes determining a power of the pump motor, applying the power to a model observer, and obtaining a value representative of a pressure based on the power and the model observer. The method also includes determining whether the value indicates a condition of the pump, and controlling the motor to operate the pump based on the condition of the pump.

In another embodiment, the invention provides a method of controlling a fluid-movement system having a motor and a pump. The motor is coupled to the pump to operate the pump. The method includes calibrating the system to obtain a calibration value for a motor parameter, obtaining a relationship between the motor parameter and a fluid parameter, and determining a trip value based on the calibration value and the relationship. The method also includes controlling the motor to operate the pump, and monitoring the operation of the pump. The monitoring act includes determining a value for the motor parameter, comparing the value to the trip value, and determining whether the comparison indicates a condition of the pump. The method of controlling the fluid-movement system also includes controlling the motor to operate the pump based on the condition of the pump.

In another embodiment, the invention provides a method of controlling a fluid-movement system having a motor and a pump. The motor is coupled to the pump to operate the pump.

The method includes determining a relationship between an input power to the motor and a flow rate through the pump, determining a calibration value for the input power, and determining a percentage drop for the relationship. The method also includes determining a trip value based on the relationship, the calibration value, and the percentage drop, and monitoring the operation of the pump. The monitoring act includes determining a first value for the input power, comparing the first value to the trip value, and determining whether the first value indicates a condition of the pump. The method of controlling the fluid-movement system also includes controlling the motor to operate the pump based on the condition of the pump.

Other features and aspects of the invention will become apparent by consideration of the detailed description and accompanying drawings.

BRIEF DESCRIPTION OF THE DRAWINGS

FIG. 12 is a chart showing a numeric relationship between input power and torque.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
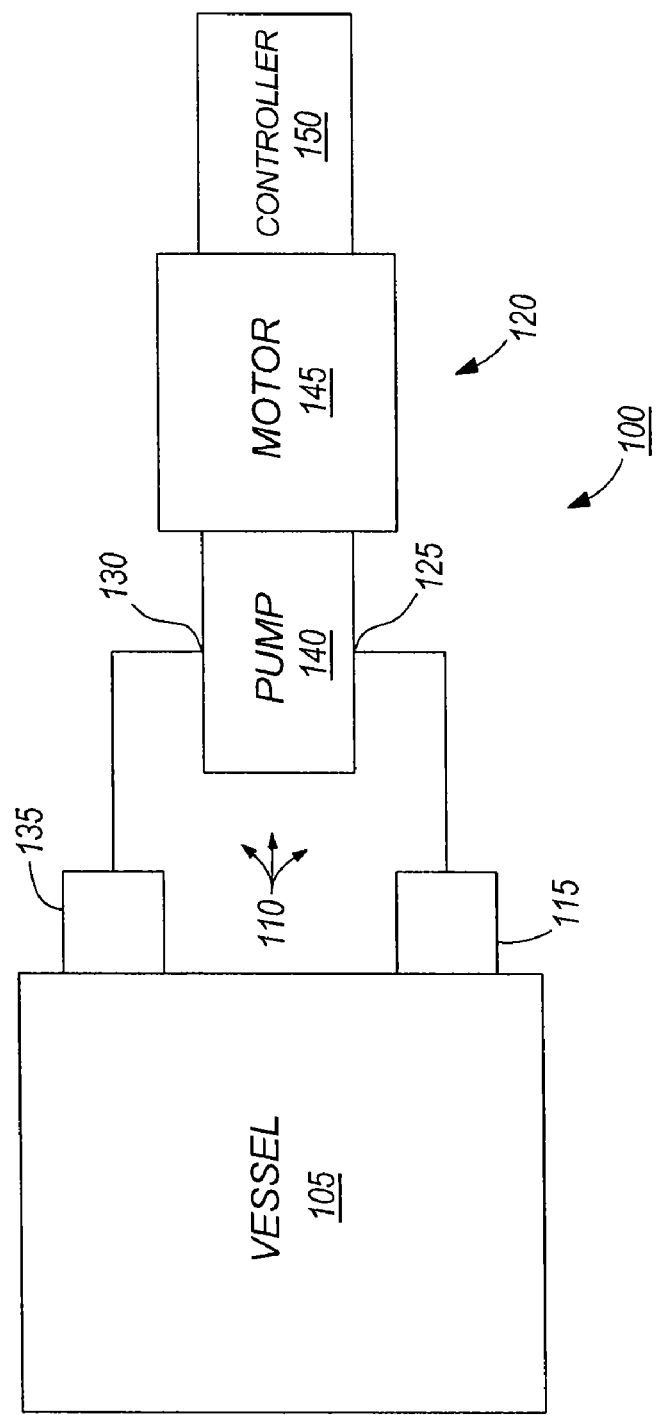
FIG. 1 is a schematic representation of a jetted-spa incorporating the invention.

FIG. 1 schematically represents a jetted-spa 100 incorporating the invention. However, the invention is not limited to the jetted-spa 100 and can be used in other jetted-fluid systems (e.g., pools, whirlpools, jetted-tubs, etc.). It is also envisioned that the invention can be used in other applications (e.g., fluid-pumping applications).

As shown in FIG. 1, the spa 100 includes a vessel 105. As used herein, the vessel 105 is a hollow container such as a tub, pool, tank, or vat that holds a load. The load includes a fluid, such as chlorinated water, and may include one or more occupants or items. The spa further includes a fluid-movement system 110 coupled to the vessel 105. The fluid-movement system 110 includes a drain 115, a pumping apparatus 120 having an inlet 125 coupled to the drain and an outlet 130, and a return 135 coupled to the outlet 130 of the pumping apparatus 120. The pumping apparatus 120 includes a pump 140, a motor 145 coupled to the pump 140, and a controller 150 for controlling the motor 145. For the constructions described herein, the pump 140 is a centrifugal pump and the motor 145 is an induction motor (e.g., capacitor-start, capacitor-run induction motor; split-phase induction motor; three-phase induction motor; etc.). However, the invention is not limited to this type of pump or motor. For example, a brushless, direct current (DC) motor may be used in a different pumping application. For other constructions, a jetted-fluid system can include multiple drains, multiple returns, or even multiple fluid movement systems.

Referring back to FIG. 1, the vessel 105 holds a fluid. When the fluid movement system 110 is active, the pump 140 causes the fluid to move from the drain 115, through the pump 140, and jet into the vessel 105. This pumping operation occurs when the controller 150 controllably provides a power to the motor 145, resulting in a mechanical movement by the motor 145. The coupling of the motor 145 (e.g., a direct coupling or an indirect coupling via a linkage system) to the pump 140 results in the motor 145 mechanically operating the pump 140 to move the fluid. The operation of the controller 150 can be via an operator interface, which may be as simple as an ON switch.

Figure 2:
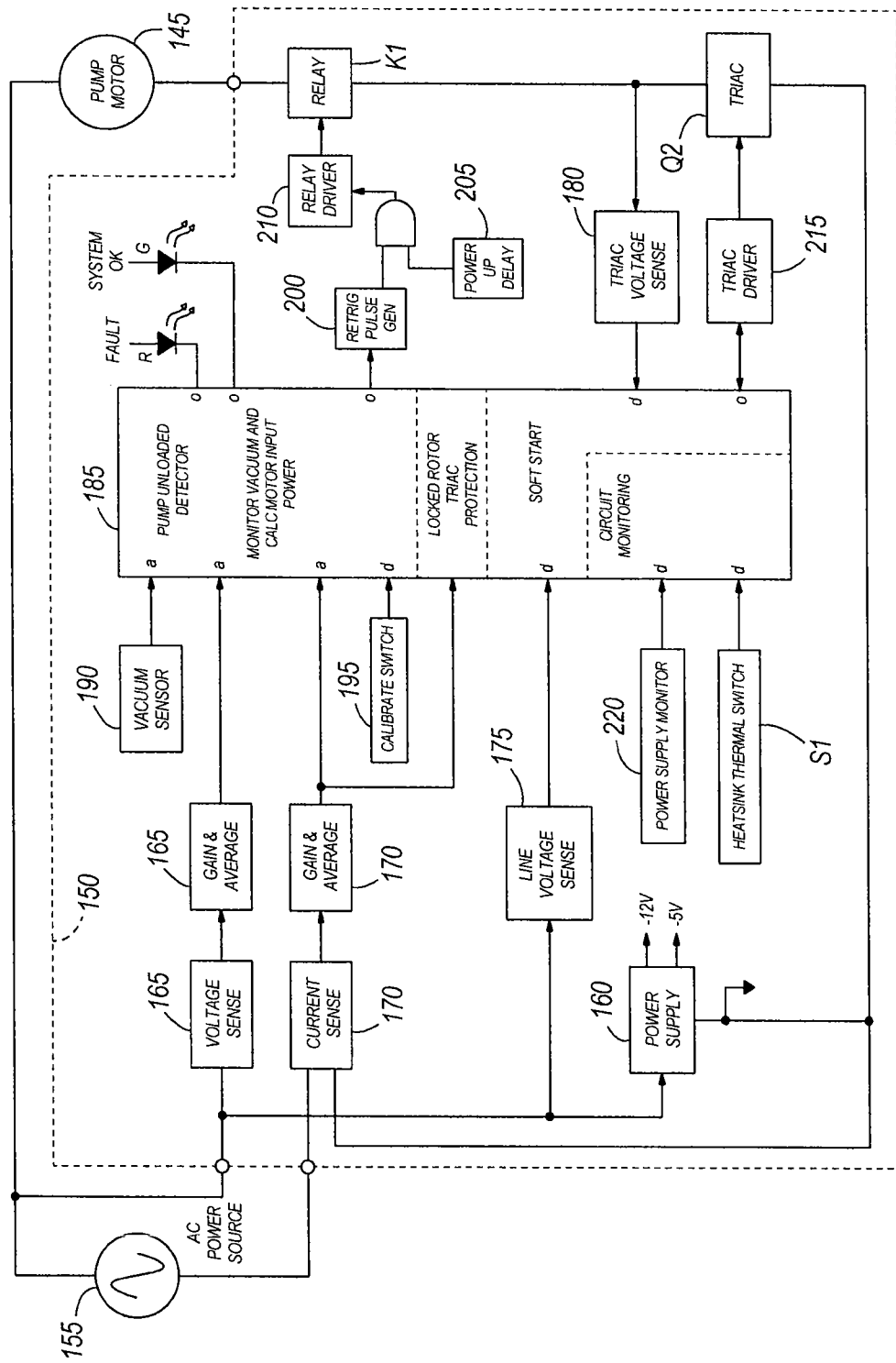
FIG. 2 is a block diagram of a first controller capable of being used in the jetted-spa shown in FIG. 1.
Figure 3A:
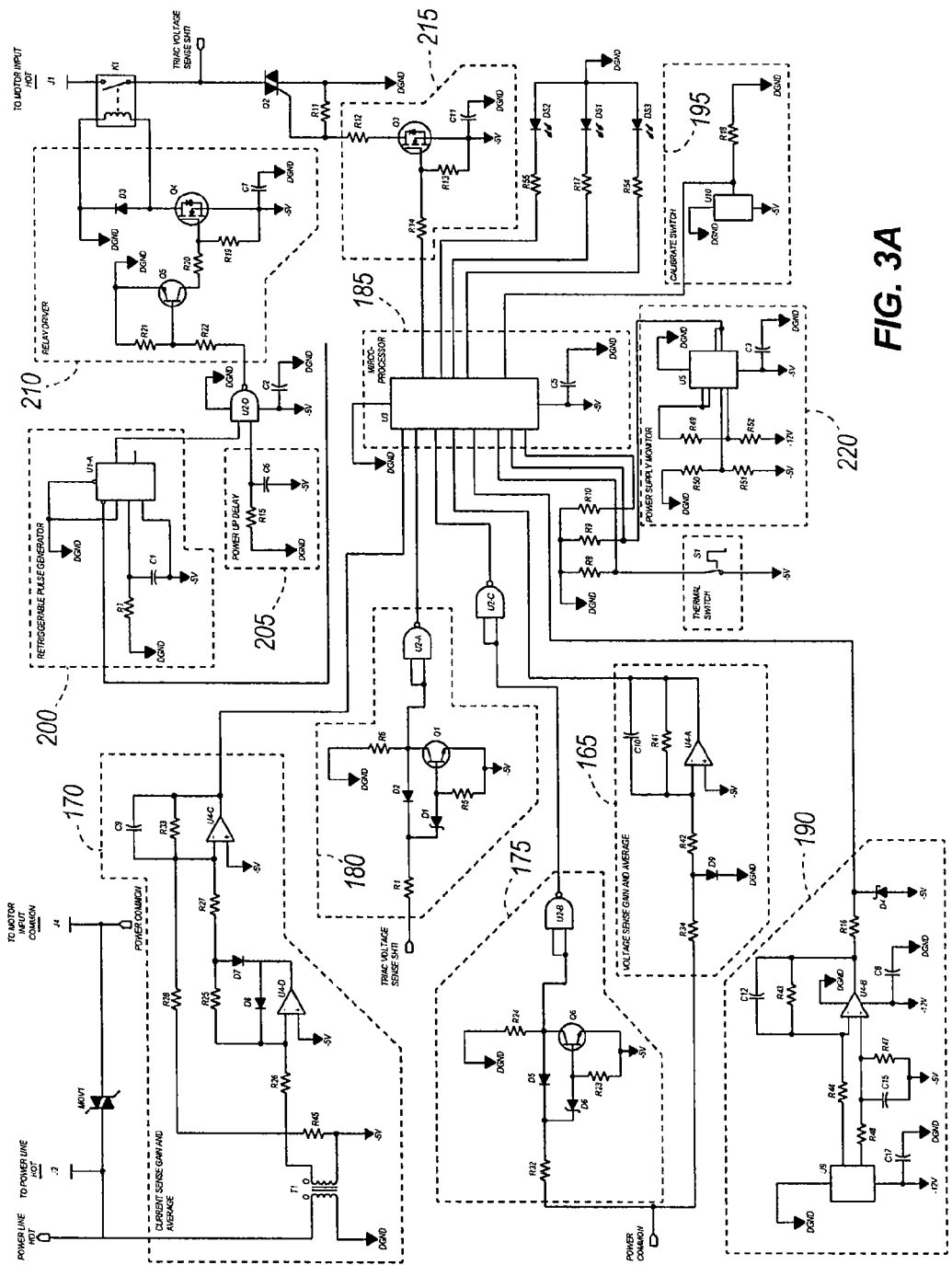
FIGS. 3A and 3B are electrical schematics of the first controller shown in FIG. 2.
Figure 3B:
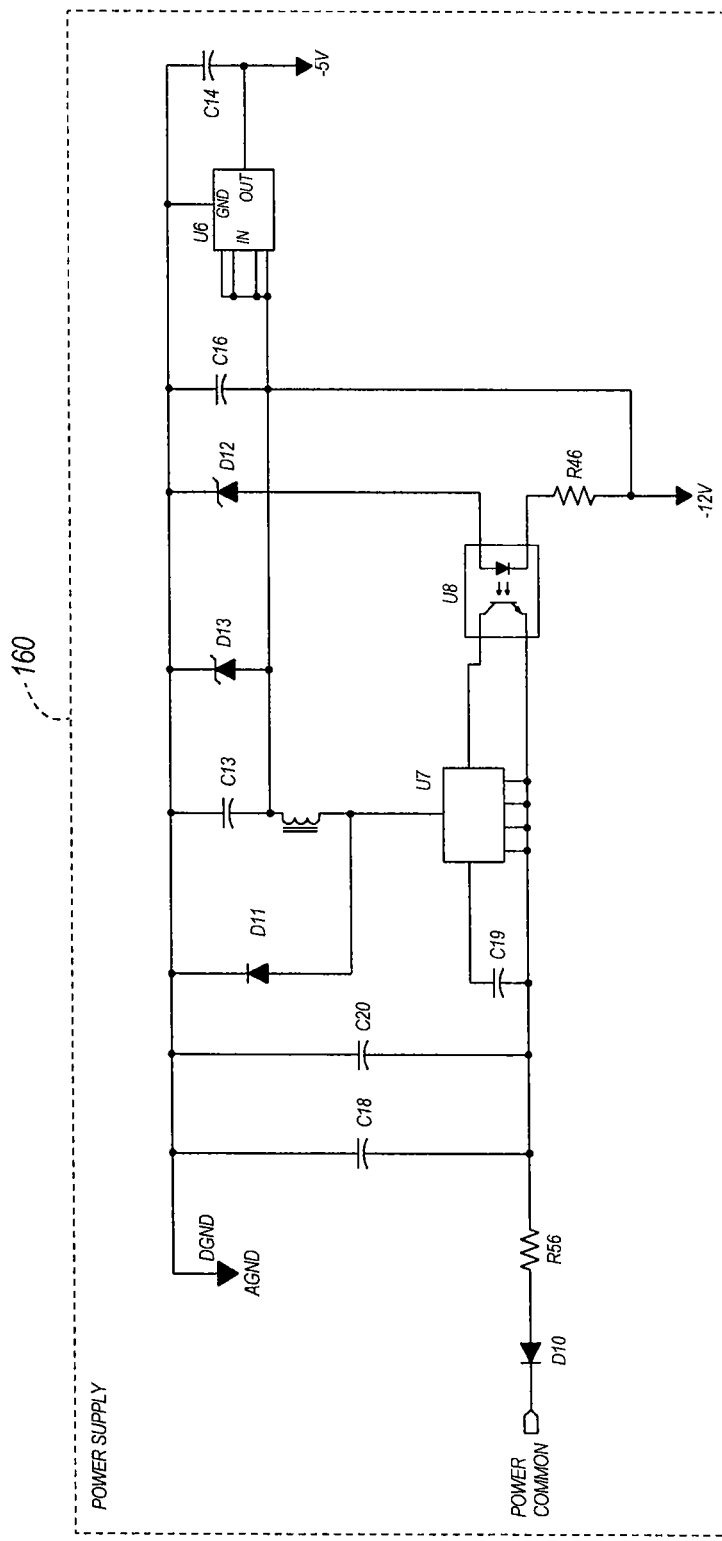

FIG. 2 is a block diagram of a first construction of the controller 150, and FIGS. 3A and 3B are electrical schematics of the controller 150. As shown in FIG. 2, the controller 150 is electrically connected to a power source 155 and the motor 145.

With reference to FIG. 2 and FIG. 3B, the controller 150 includes a power supply 160. The power supply 160 includes resistors R46 and R56; capacitors C13, C14, C16, C18, C19, and C20; diodes D10 and D11; zener diodes D12 and D13; power supply controller U7; regulator U6; and optical switch U8. The power supply 160 receives power from the power source 155 and provides the proper DC voltage (e.g., ±5 VDC and ±12 VDC) for operating the controller 150.

For the controller 150 shown in FIGS. 2 and 3A, the controller 150 monitors motor input power and pump inlet side pressure to determine if a drain obstruction has taken place. If the drain 115 or plumbing is plugged on the suction side of the pump 140, the pressure on that side of the pump 140 increases. At the same time, because the pump 140 is no longer pumping water, input power to the motor 145 drops. If either of these conditions occur, the controller 150 declares a fault, the motor 145 powers down, and a fault indicator lights.

A voltage sense and average circuit 165, a current sense and average circuit 170, a line voltage sense circuit 175, a triac voltage sense circuit 180, and the microcontroller 185 perform the monitoring of the input power. One example voltage sense and average circuit 165 is shown in FIG. 3A. The voltage sense and average circuit 165 includes resistors R34, R41, and R42; diode D9; capacitor C10; and operational amplifier U4A. The voltage sense and average circuit 165 rectifies the voltage from the power source 155 and then performs a DC average of the rectified voltage. The DC average is then fed to the microcontroller 185.

One example current sense and average circuit 170 is shown in FIG. 3A. The current sense and average circuit 170 includes transformer T1 and resistor R45, which act as a current sensor that senses the current applied to the motor. The current sense and average circuit also includes resistors R25, R26, R27, R28, and R33; diodes D7 and D8; capacitor C9; and operational amplifiers U4C and U4D, which rectify and average the value representing the sensed current. For example, the resultant scaling of the current sense and average circuit 170 can be a negative five to zero volt value corresponding to a zero to twenty-five amp RMS value. The resulting DC average is then fed to the microcontroller 185.

One example line voltage sense circuit 175 is shown in FIG. 3A. The line voltage sense circuit 175 includes resistors R23, R24, and R32; diode D5; zener diode D6; transistor Q6; and NAND gate U2B. The line voltage sense circuit 175 includes a zero-crossing detector that generates a pulse signal. The pulse signal includes pulses that are generated each time the line voltage crosses zero volts.

One example triac voltage sense circuit 180 is shown in FIG. 3A. The triac voltage sense circuit 180 includes resistors R1, R5, and R6; diode D2; zener diode D1; transistor Q1; and NAND gate U2A. The triac voltage sense circuit includes a zero-crossing detector that generates a pulse signal. The pulse signal includes pulses that are generated each time the motor current crosses zero.

One example microcontroller 185 that can be used with the invention is a Motorola brand microcontroller, model no. MC68HC908QY4CP. The microcontroller 185 includes a processor and a memory. The memory includes software instructions that are read, interpreted, and executed by the processor to manipulate data or signals. The memory also includes data storage memory. The microcontroller 185 can include other circuitry (e.g., an analog-to-digital converter) necessary for operating the microcontroller 185. In general, the microcontroller 185 receives inputs (signals or data), executes software instructions to analyze the inputs, and generates outputs (signals or data) based on the analyses. Although the microcontroller 185 is shown and described, the functions of the microcontroller 185 can be implemented with other devices, including a variety of integrated circuits (e.g., an application-specific-integrated circuit), programmable devices, and/or discrete devices, as would be apparent to one of ordinary skill in the art. Additionally, it is envisioned that the microcontroller 185 or similar circuitry can be distributed among multiple microcontrollers 185 or similar circuitry. It is also envisioned that the microcontroller 185 or similar circuitry can perform the function of some of the other circuitry described (e.g., circuitry 165-180) above for the controller 150. For example, the microcontroller 185, in some constructions, can receive a sensed voltage and/or sensed current and determine an averaged voltage, an averaged current, the zero-crossings of the sensed voltage, and/or the zero crossings of the sensed current.

The microcontroller 185 receives the signals representing the average voltage applied to the motor 145, the average current through the motor 145, the zero crossings of the motor voltage, and the zero crossings of the motor current. Based on the zero crossings, the microcontroller 185 can determine a power factor. The power factor can be calculated using known mathematical equations or by using a lookup table based on the mathematical equations. The microcontroller 185 can then calculate a power with the averaged voltage, the averaged current, and the power factor as is known. As will be discussed later, the microcontroller 185 compares the calculated power with a power calibration value to determine whether a fault condition (e.g., due to an obstruction) is present.

Referring again to FIGS. 2 and 3A, a pressure (or vacuum) sensor circuit 190 and the microcontroller 185 monitor the pump inlet side pressure. One example pressure sensor circuit 190 is shown in FIG. 3A. The pressure sensor circuit 190 includes resistors R16, R43, R44, R47, and R48; capacitors C8, C12, C15, and C17; zener diode D4, piezoresistive sensor U9, and operational amplifier U4-B. The piezoresistive sensor U9 is plumbed into the suction side of the pump 140. The pressure sensor circuit 190 and microcontroller 185 translate and amplify the signal generated by the piezoresistive sensor U9 into a value representing inlet pressure. As will be discussed later, the microcontroller 185 compares the resulting pressure value with a pressure calibration value to determine whether a fault condition (e.g., due to an obstruction) is present.

The calibrating of the controller 150 occurs when the user activates a calibrate switch 195. One example calibrate switch 195 is shown in FIG. 3A. The calibrate switch 195 includes resistor R18 and Hall effect switch U10. When a magnet passes Hall effect switch U10, the switch 195 generates a signal provided to the microcontroller 185. Upon receiving the signal, the microcontroller 185 stores a pressure calibration value for the pressure sensor by acquiring the current pressure and stores a power calibration value for the motor by calculating the present power.

As stated earlier, the controller 150 controllably provides power to the motor 145. With references to FIGS. 2 and 3A, the controller 150 includes a retriggerable pulse generator circuit 200. The retriggerable pulse generator circuit 200 includes resistor R7, capacitor C1, and pulse generator U1A, and outputs a value to NAND gate U2D if the retriggerable pulse generator circuit 200 receives a signal having a pulse frequency greater than a set frequency determined by resistor R7 and capacitor C1. The NAND gate U2D also receives a signal from power-up delay circuit 205, which prevents nuisance triggering of the relay on startup. The output of the NAND gate U2D is provided to relay driver circuit 210. The relay driver circuit 210 shown in FIG. 3A includes resistors R19, R20, R21, and R22; capacitor C7; diode D3; and switches Q5 and Q4. The relay driver circuit 210 controls relay K1.

The microcontroller 185 also provides an output to triac driver circuit 215, which controls triac Q2. As shown in FIG. 3A, the triac driver circuit 215 includes resistors R12, R13, and R14; capacitor C11; and switch Q3. In order for current to flow to the motor, relay K1 needs to close and triac Q2 needs to be triggered on.

The controller 150 also includes a thermoswitch S1 for monitoring the triac heat sink, a power supply monitor 220 for monitoring the voltages produced by the power supply 160, and a plurality of LEDs DS1, DS2, and DS3 for providing information to the user. In the construction shown, a green LED DS1 indicates power is applied to the controller 150, a red LED DS2 indicates a fault has occurred, and a third LED DS3 is a heartbeat LED to indicate the microcontroller 185 is functioning. Of course, other interfaces can be used for providing information to the operator.

The following describes the normal sequence of events for one method of operation of the controller 150. When the fluid movement system 110 is initially activated, the system 110 may have to draw air out of the suction side plumbing and get the fluid flowing smoothly. This "priming" period usually lasts only a few seconds, but could last a minute or more if there is a lot of air in the system. After priming, the water flow, suction side pressure, and motor input power remain relatively constant. It is during this normal running period that the circuit is effective at detecting an abnormal event. The microcontroller 185 includes a startup-lockout feature that keeps the monitor from detecting the abnormal conditions during the priming period.

After the system 110 is running smoothly, the spa operator can calibrate the controller 150 to the current spa running conditions. The calibration values are stored in the microcontroller 185 memory, and will be used as the basis for monitoring the spa 100. If for some reason the operating conditions of the spa change, the controller 150 can be re-calibrated by the operator. If at any time during normal operations, however, the suction side pressure increases substantially (e.g., 12%) over the pressure calibration value, or the motor input power drops (e.g., 12%) under the power calibration value, the pump will be powered down and a fault indicator is lit.

As discussed earlier, the controller 150 measures motor input power, and not just motor power factor or input current. Some motors have electrical characteristics such that power factor remains constant while the motor is unloaded. Other motors have an electrical characteristic such that current remains relatively constant when the pump is unloaded. However, the input power drops on pump systems when the drain is plugged, and water flow is impeded.

The voltage sense and average circuit 165 generates a value representing the average power line voltage and the current sense and average circuit 170 generates a value representing the average motor current. Motor power factor is derived from the difference between power line zero crossing events and triac zero crossing events. The line voltage sense circuit 175 provides a signal representing the power line zero crossings. The triac zero crossings occur at the zero crossings of the motor current. The triac voltage sense circuit 180 provides a signal representing the triac zero crossings. The time difference from the zero crossing events is used to look up the motor power factor from a table stored in the microcontroller 185. This data is then used to calculate the motor input power using equation e1.

$$V_{avg} * I_{avg} * PF = \text{Motor\_Input\_Power} \quad [e1]$$

The calculated motor_input_power is then compared to the calibrated value to determine whether a fault has occurred. If a fault has occurred, the motor is powered down and the fault LED DS2 is lit.

Figure 4:
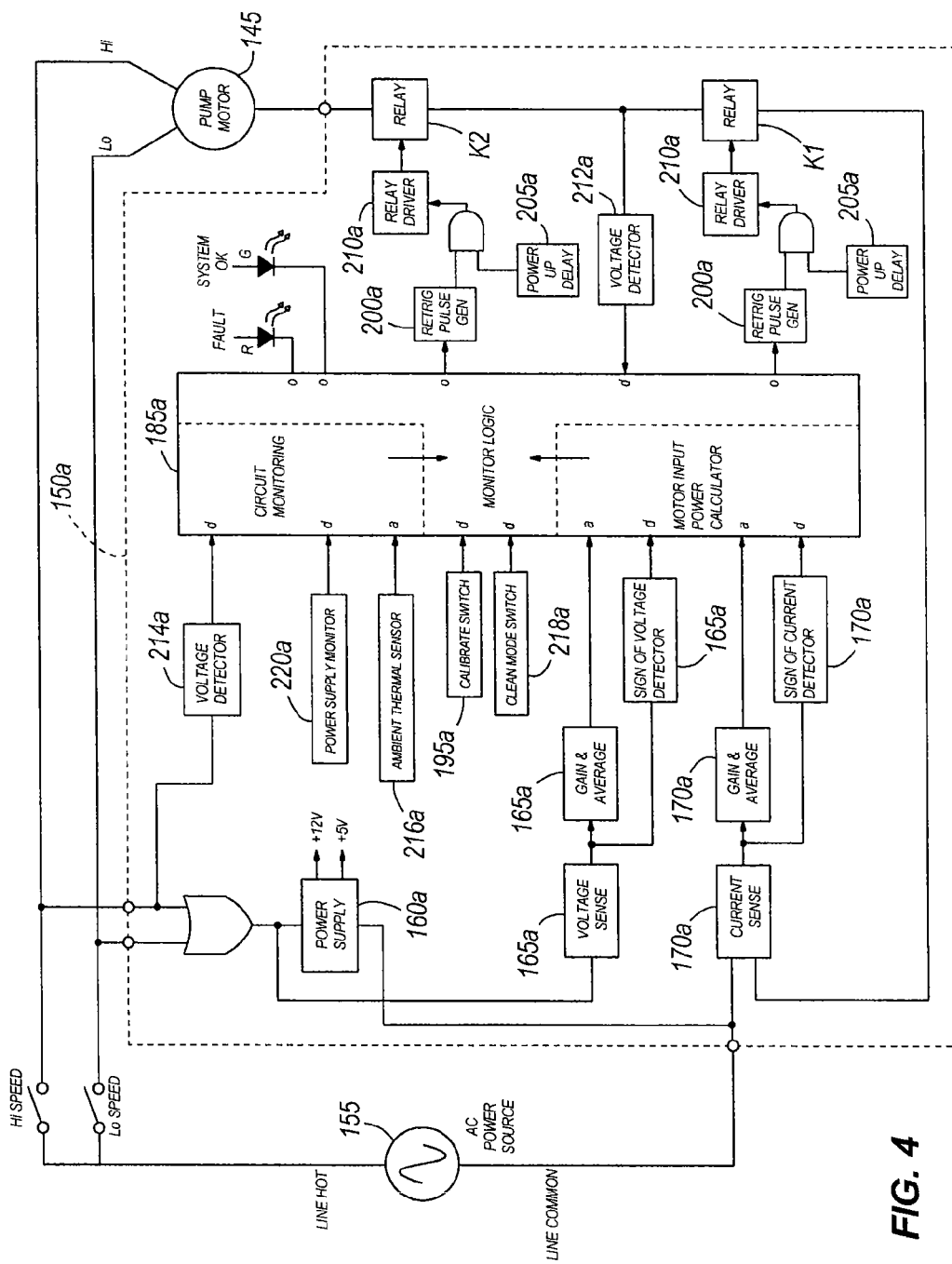
FIG. 4 is a block diagram of a second controller capable of being used in the jetted-spa shown in FIG. 1.
Figure 5A:
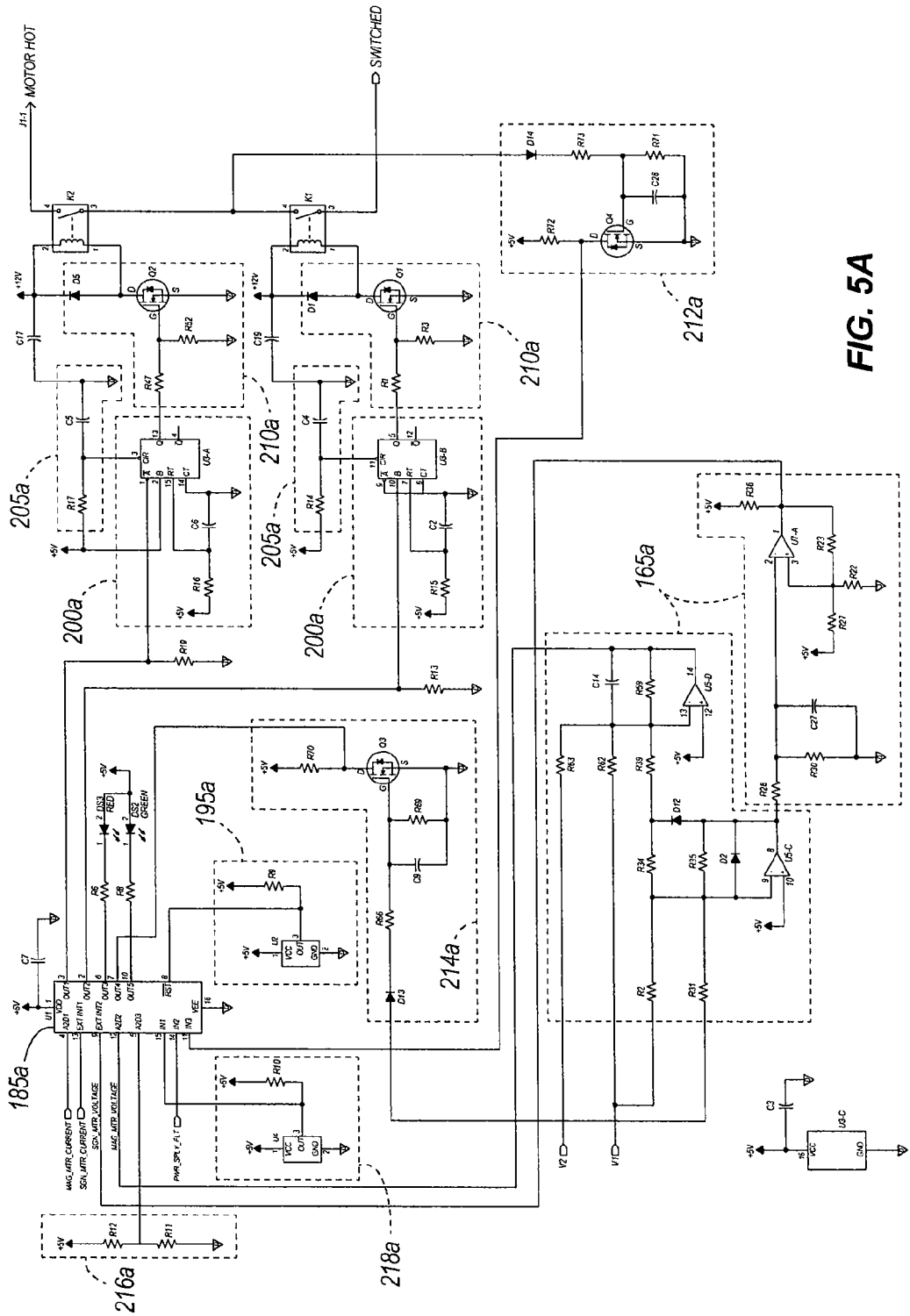
FIGS. 5A and 5B are electrical schematics of the second controller shown in FIG. 4.
Figure 5B:
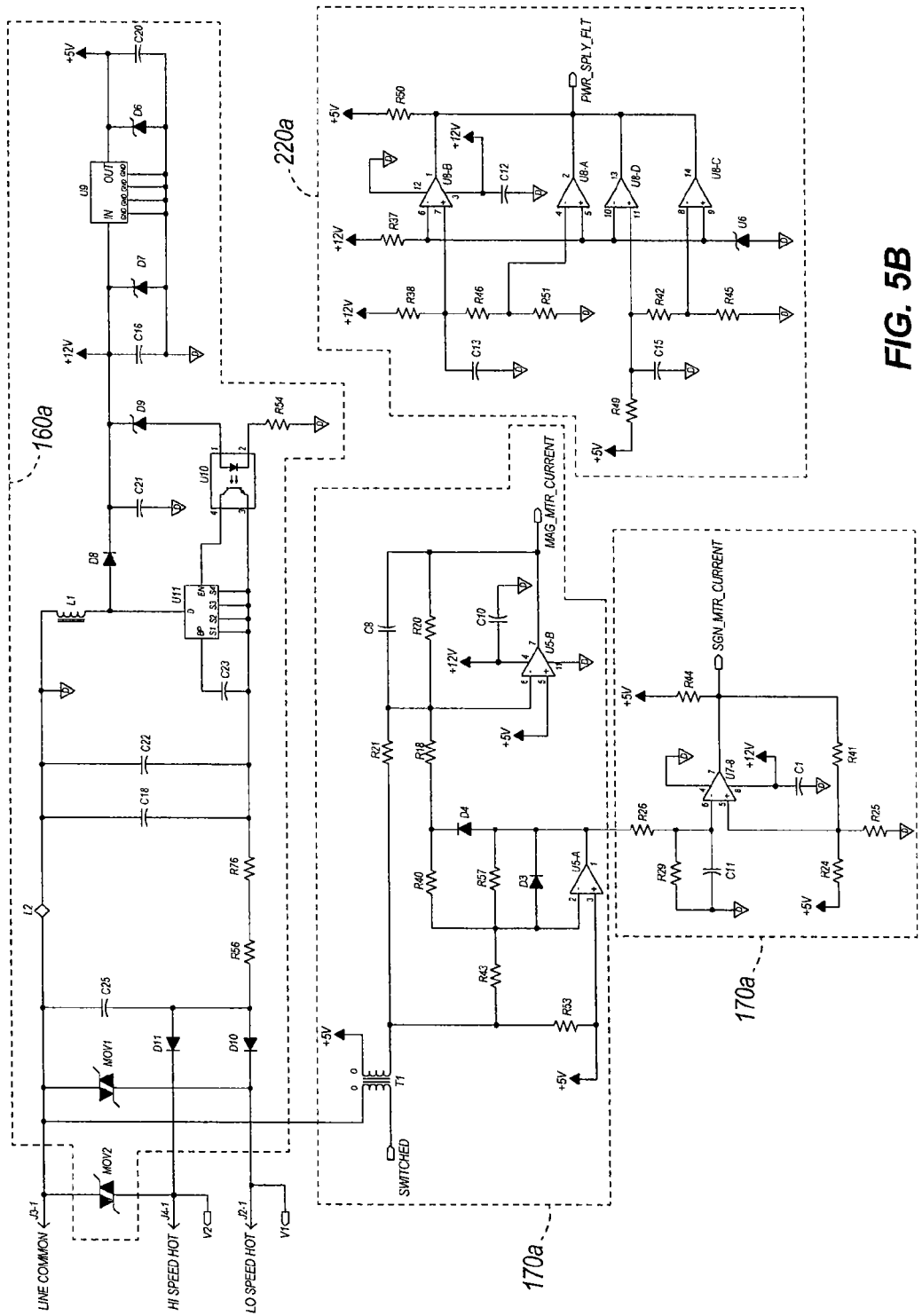

FIG. 4 is a block diagram of a second construction of the controller 150a, and FIGS. 5A and 5B are an electrical schematic of the controller 150a. As shown in FIG. 4, the controller 150a is electrically connected to a power source 155 and the motor 145.

With reference to FIG. 4 and FIG. 5B, the controller 150a includes a power supply 160a. The power supply 160a includes resistors R54, R56 and R76; capacitors C16, C18, C20, C21, C22, C23 and C25; diodes D8, D10 and D11; zener diodes D6, D7 and D9; power supply controller U11; regulator U9; inductors L1 and L2, surge suppressors MOV1 and MOV2, and optical switch U10. The power supply 160a receives power from the power source 155 and provides the proper DC voltage (e.g., +5 VDC and +12 VDC) for operating the controller 150a.

For the controller 150a shown in FIG. 4, FIG. 5A, and FIG. 5B, the controller 150a monitors motor input power to determine if a drain obstruction has taken place. Similar to the earlier disclosed construction, if the drain 115 or plumbing is plugged on the suction side of the pump 140, the pump 140 will no longer be pumping water, and input power to the motor 145 drops. If this condition occurs, the controller 150a declares a fault, the motor 145 powers down, and a fault indicator lights.

A voltage sense and average circuit 165a, a current sense and average circuit 170a, and the microcontroller 185a perform the monitoring of the input power. One example voltage sense and average circuit 165a is shown in FIG. 5A. The voltage sense and average circuit 165a includes resistors R2, R31, R34, R35, R39, R59, R62, and R63; diodes D2 and D12; capacitor C14; and operational amplifiers U5C and U5D. The voltage sense and average circuit 165a rectifies the voltage from the power source 155 and then performs a DC average of the rectified voltage. The DC average is then fed to the microcontroller 185a. The voltage sense and average circuit 165a further includes resistors R22, R23, R27, R28, R30, and R36; capacitor C27; and comparator U7A; which provide the sign of the voltage waveform (i.e., acts as a zero-crossing detector) to the microcontroller 185a.

One example current sense and average circuit 170a is shown in FIG. 5B. The current sense and average circuit 170a includes transformer T1 and resistor R53, which act as a current sensor that senses the current applied to the motor 145. The current sense and average circuit 170a also includes resistors R18, R20, R21, R40, R43, and R57; diodes D3 and D4; capacitor C8; and operational amplifiers U5A and U5B, which rectify and average the value representing the sensed current. For example, the resultant scaling of the current sense and average circuit 170a can be a positive five to zero volt value corresponding to a zero to twenty-five amp RMS value. The resulting DC average is then fed to the microcontroller 185a. The current sense and average circuit 170a further includes resistors R24, R25, R26, R29, R41, and R44; capacitor C11; and comparator U7B; which provide the sign of the current waveform (i.e., acts as a zero-crossing detector) to microcontroller 185a.

One example microcontroller 185a that can be used with the invention is a Motorola brand microcontroller, model no. MC68HC908QY4CP. Similar to what was discussed for the earlier construction, the microcontroller 185a includes a processor and a memory. The memory includes software instructions that are read, interpreted, and executed by the processor to manipulate data or signals. The memory also includes data storage memory. The microcontroller 185a can include other circuitry (e.g., an analog-to-digital converter) necessary for operating the microcontroller 185a and/or can perform the function of some of the other circuitry described above for the controller 150a. In general, the microcontroller 185a receives inputs (signals or data), executes software instructions to analyze the inputs, and generates outputs (signals or data) based on the analyses.

The microcontroller 185a receives the signals representing the average voltage applied to the motor 145, the average current through the motor 145, the zero crossings of the motor voltage, and the zero crossings of the motor current. Based on the zero crossings, the microcontroller 185a can determine a power factor and a power as was described earlier. The microcontroller 185a can then compare the calculated power with a power calibration value to determine whether a fault condition (e.g., due to an obstruction) is present.

The calibrating of the controller 150a occurs when the user activates a calibrate switch 195a. One example calibrate switch 195a is shown in FIG. 5A, which is similar to the calibrate switch 195 shown in FIG. 3A. Of course, other calibrate switches are possible. In one method of operation for the calibrate switch 195a, a calibration fob needs to be held near the switch 195a when the controller 150a receives an initial power. After removing the magnet and cycling power, the controller 150a goes through priming and enters an automatic calibration mode (discussed below).

The controller 150a controllably provides power to the motor 145. With references to FIGS. 4 and 5A, the controller 150a includes a retriggerable pulse generator circuit 200a. The retriggerable pulse generator circuit 200a includes resistors R15 and R16, capacitors C2 and C6, and pulse generators U3A and U3B, and outputs a value to the relay driver circuit 210a if the retriggerable pulse generator circuit 200a receives a signal having a pulse frequency greater than a set frequency determined by resistors R15 and R16, and capacitors C2 and C6. The retriggerable pulse generators U3A and U3B also receive a signal from power-up delay circuit 205a, which prevents nuisance triggering of the relays on startup. The relay driver circuits 210a shown in FIG. 5A include resistors R1, R3, R47, and R52; diodes D1 and D5; and switches Q1 and Q2. The relay driver circuits 210a control relays K1 and K2. In order for current to flow to the motor, both relays K1 and K2 need to "close".

Figure 6:
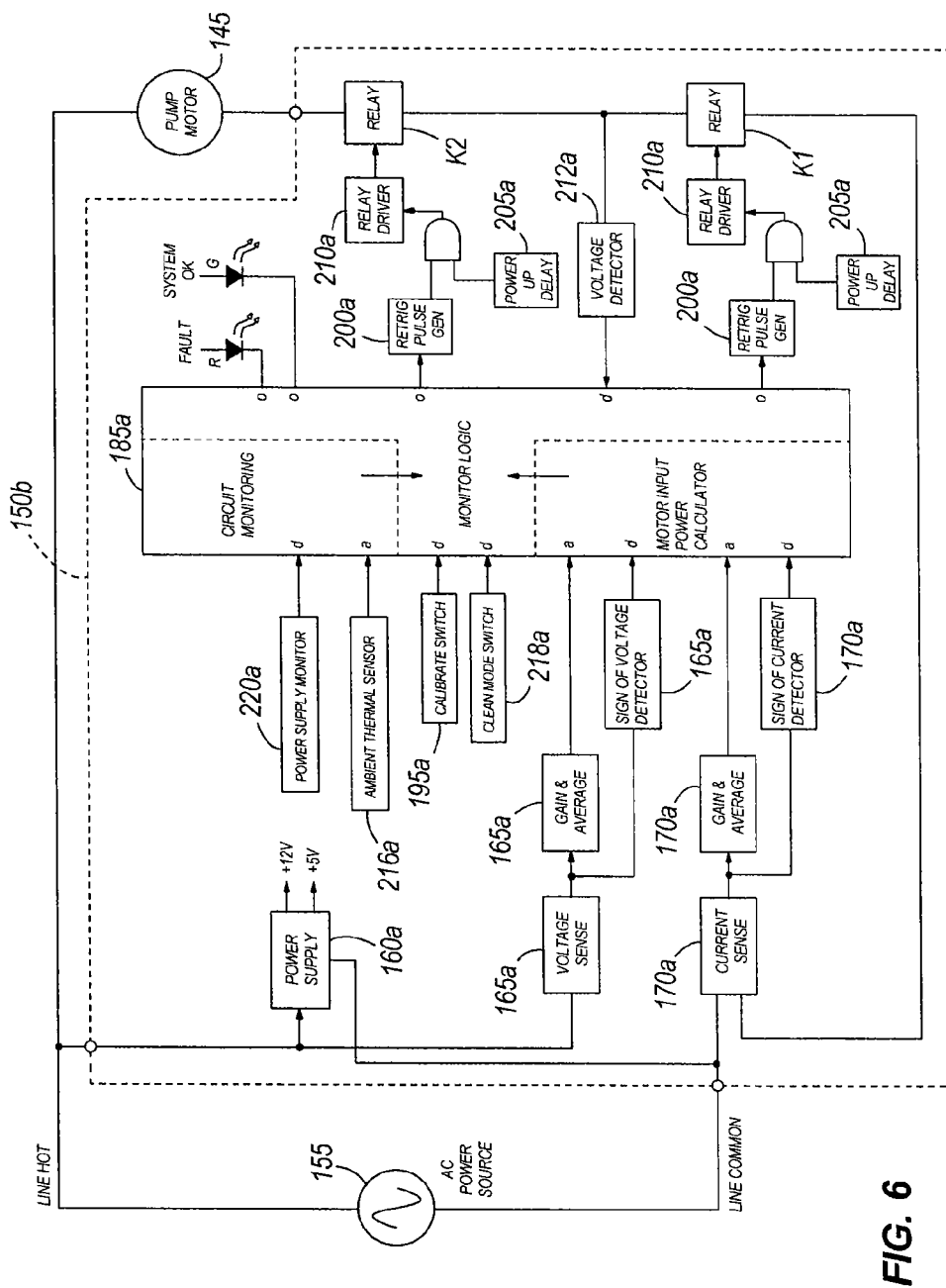
FIG. 6 is a block diagram of a third controller capable of being used in the jetted-spa shown in FIG. 1.

The controller 150a further includes two voltage detectors 212a and 214a. The first voltage detector 212a includes resistors R71, R72, and R73; capacitor C26; diode D14; and switch Q4. The first voltage detector 212a detects when voltage is present across relay K1, and verifies that the relays are functioning properly before allowing the motor to be energized. The second voltage detector 214a includes resistors R66, R69, and R70; capacitor C9; diode D13; and switch Q3. The second voltage detector 214a senses if a two speed motor is being operated in high or low speed mode. The motor input power trip values are set according to what speed the motor is being operated. It is also envisioned that the controller 150a can be used with a single speed motor without the second voltage detector 214a (e.g., controller 150b is shown in FIG. 6).

The controller 150a also includes an ambient thermal sensor circuit 216a for monitoring the operating temperature of the controller 150a, a power supply monitor 220a for monitoring the voltages produced by the power supply 160a, and a plurality of LEDs DS1 and DS3 for providing information to the user. In the construction shown, a green LED DS2 indicates power is applied to the controller 150a, and a red LED DS3 indicates a fault has occurred. Of course, other interfaces can be used for providing information to the operator.

The controller 150a further includes a clean mode switch 218a, which includes switch U4 and resistor R10. The clean mode switch can be actuated by an operator (e.g., a maintenance person) to deactivate the power monitoring function described herein for a time period (e.g., 30 minutes so that maintenance person can clean the vessel 105). Moreover, the red LED DS3 can be used to indicate that controller 150a is in a clean mode. After the time period, the controller 150a returns to normal operation. In some constructions, the maintenance person can actuate the clean mode switch 218a for the controller 150a to exit the clean mode before the time period is completed.

In some cases, it may be desirable to deactivate the power monitoring function for reasons other than performing cleaning operations on the vessel 105. Such cases may be referred as "deactivate mode", "disabled mode", "unprotected mode", or the like. Regardless of the name, this later mode of operation can be at least partially characterized by the instructions defined under the clean mode operation above. Moreover, when referring to the clean mode and its operation herein, the discussion also applies to these later modes for deactivating the power monitoring function and vice versa.

The following describes the normal sequence of events for one method of operation of the controller 150a, some of which may be similar to the method of operation of the controller 150. When the fluid movement system 110 is initially activated, the system 110 may have to prime (discussed above) the suction side plumbing and get the fluid flowing smoothly (referred to as "the normal running period"). It is during the normal running period that the circuit is most effective at detecting an abnormal event.

Upon a system power-up, the system 110 can enter a priming period. The priming period can be preset for a time duration (e.g., a time duration of 3 minutes), or for a time duration determined by a sensed condition. After the priming period, the system 110 enters the normal running period. The controller 150a can include instructions to perform an automatic calibration to determine one or more calibration values after a first system power-up. One example calibration value is a power calibration value. In some cases, the power calibration value is an average of monitored power values over a predetermined period of time. The power calibration value is stored in the memory of the microcontroller 185, and will be used as the basis for monitoring the vessel 105.

If for some reason the operating conditions of the vessel 105 change, the controller 150a can be re-calibrated by the operator. In some constructions, the operator actuates the calibrate switch 195a to erase the existing one or more calibration values stored in the memory of the microcontroller 185. The operator then powers down the system 110, particularly the motor 145, and performs a system power-up. The system 110 starts the automatic calibration process as discussed above to determine new one or more calibration values. If at any time during normal operation, the monitored power varies from the power calibration value (e.g., varies from a 12.5% window around the power calibration value), the motor 145 will be powered down and the fault LED DS3 is lit.

In one construction, the automatic calibration instructions include not monitoring the power of the motor 145 during a start-up period, generally preset for a time duration (e.g., 2 seconds), upon the system power-up. In the case when the system 110 is operated for the first time, the system 110 enters the prime period, upon completion of the start-up period, and the power of the motor 145 is monitored to determine the power calibration value. As indicated above, the power calibration value is stored in the memory of the microcontroller 185. After completion of the 3 minutes of the priming period, the system 110 enters the normal running period. In subsequent system power-ups, the monitored power is compared against the power calibration value stored in the memory of the microcontroller 185 memory during the priming period. More specifically, the system 110 enters the normal running period when the monitored power rises above the power calibration value during the priming period. In some cases, the monitored power does not rise above the power calibration value within the 3 minutes of the priming period. As a consequence, the motor 145 is powered down and a fault indicator is lit.

In other constructions, the priming period of the automatic calibration can include a longer preset time duration (for example, 4 minutes) or an adjustable time duration capability. Additionally, the controller 150a can include instructions to perform signal conditioning operations to the monitored power. For example, the controller 150a can include instructions to perform an IIR filter to condition the monitored power. In some cases, the IIR filter can be applied to the monitored power during the priming period and the normal operation period. In other cases, the IIR filter can be applied to the monitored power upon determining the power calibration value after the priming period.

Similar to controller 150, the controller 150*a* measures motor input power, and not just motor power factor or input current. However, it is envisioned that the controllers 150 or 150*a* can be modified to monitor other motor parameters (e.g., only motor current, only motor power factor, or motor speed). But motor input power is the preferred motor parameter for controller 150*a* for determining whether the water is impeded. Also, it is envisioned that the controller 150*a* can be modified to monitor other parameters (e.g., suction side pressure) of the system 110.

For some constructions of the controller 150*a*, the microcontroller 185*a* monitors the motor input power for an over power condition in addition to an under power condition. The monitoring of an over power condition helps reduce the chance that controller 150*a* was incorrectly calibrated, and/or also helps detect when the pump is over loaded (e.g., the pump is moving too much fluid).

The voltage sense and average circuit 165*a* generates a value representing the averaged power line voltage and the current sense and average circuit 170*a* generates a value representing the averaged motor current. Motor power factor is derived from the timing difference between the sign of the voltage signal and the sign of the current signal. This time difference is used to look up the motor power factor from a table stored in the microcontroller 185*a*. The averaged power line voltage, the averaged motor current, and the motor power factor are then used to calculate the motor input power using equation e1 as was discussed earlier. The calculated motor input power is then compared to the calibrated value to determine whether a fault has occurred. If a fault has occurred, the motor is powered down and the fault indicator is lit.

Redundancy is also used for the power switches of the controller 150*a*. Two relays K1 and K2 are used in series to do this function. This way, a failure of either component will still leave one switch to turn off the motor 145. As an additional safety feature, the proper operation of both relays is checked by the microcontroller 185*a* every time the motor 145 is powered-on via the relay voltage detector circuit 212*a*.

Another aspect of the controller 150*a* is that the microcontroller 185*a* provides pulses at a frequency greater than a set frequency (determined by the retriggerable pulse generator circuits) to close the relays K1 and K2. If the pulse generators U3A and U3B are not triggered at the proper frequency, the relays K1 and K2 open and the motor powers down.

As previously indicated, the microcontroller 185, 185*a* can calculate an input power based on parameters such as averaged voltage, averaged current, and power factor. The microcontroller 185, 185*a* then compares the calculated input power with the power calibration value to determine whether a fault condition (e.g., due to an obstruction) is present. Other constructions can include variations of the microcontroller 185, 185*a* and the controller 150, 150*a* operable to receive other parameters and determine whether a fault condition is present.

One aspect of the controller 150, 150*a* is that the microcontroller 185, 185*a* can monitor the change of input power over a predetermine period of time. More specifically, the microcontroller 185, 185*a* determines and monitors a power derivative value equating about a change in input power divided by a change in time. In cases where the power derivative traverses a threshold value, the controller 150, 150*a* controls the motor 145 to shut down the pump 140. This aspect of the controller 150, 150*a* may be operable in replacement of, or in conjunction with, other similar aspects of the controller 150, 150*a*, such as shutting down the motor 145 when the power level of the motor 145 traverses a predetermined value.

Figure 7:
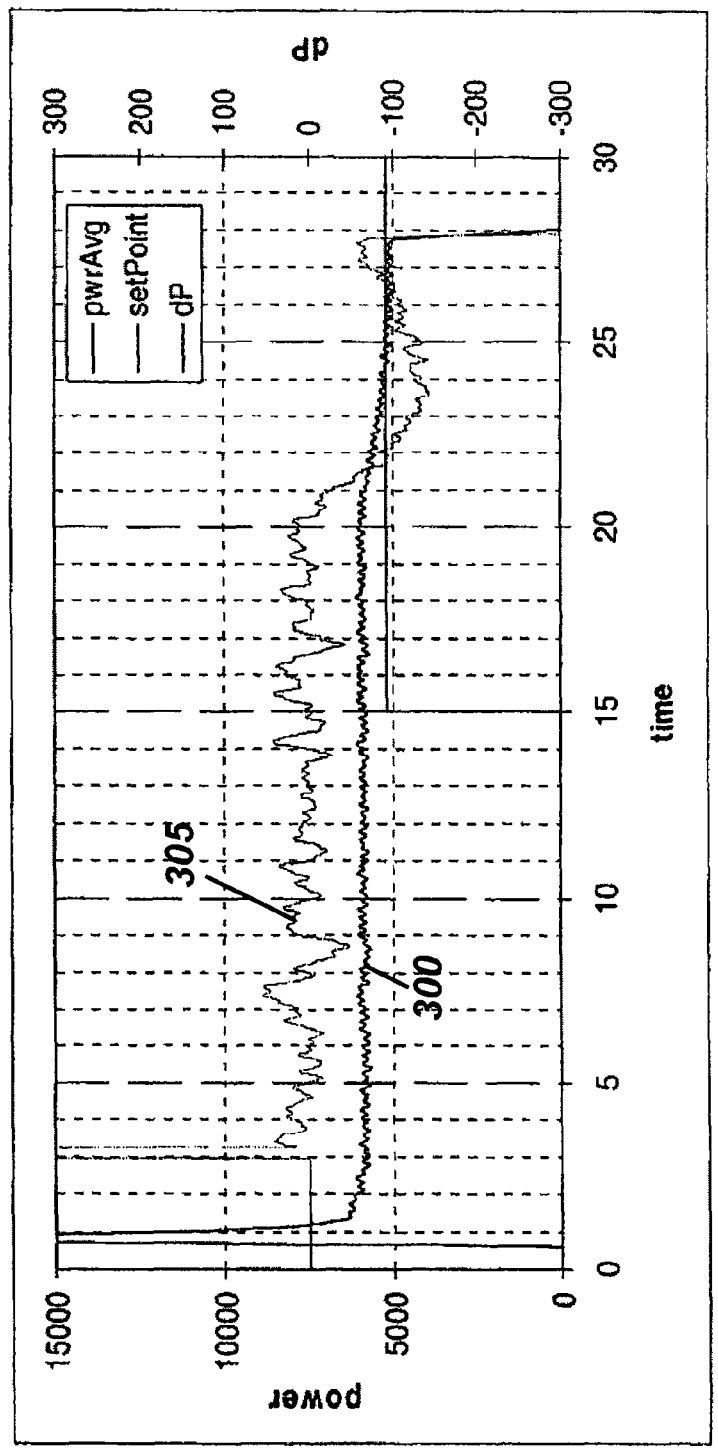
FIG. 7 is a graph showing an input power signal and a derivative power signal as a function of time.

For example, FIG. 7 shows a graph indicating input power and power derivative as functions of time. More specifically, FIG. 7 shows a power reading (line 300) and a power derivate value (line 305), over a 30-second time period, of a motor 145 calibrated at a power threshold value of 5000 and a power derivative threshold of −100. In this particular example, a water blockage in the fluid-movement system 110 (shown in FIG. 1) occurs at the 20-second mark. It can be observed from FIG. 7 that the power reading 300 indicates a power level drop below the threshold value of 5000 at the 27-second mark, causing the controller 150, 150*a* to shut down the pump 140 approximately at the 28-second mark. It can also be observed that the power derivative value 305 drops below the −100 threshold value at the 22-second mark, causing the controller 150, 150*a* to shut down the pump 140 approximately at the 23-second mark. Other parameters of the motor 145 (e.g., torque) can be monitored by the microcontroller 185, 185*a*, for determining a potential entrapment event.

Figure 8:
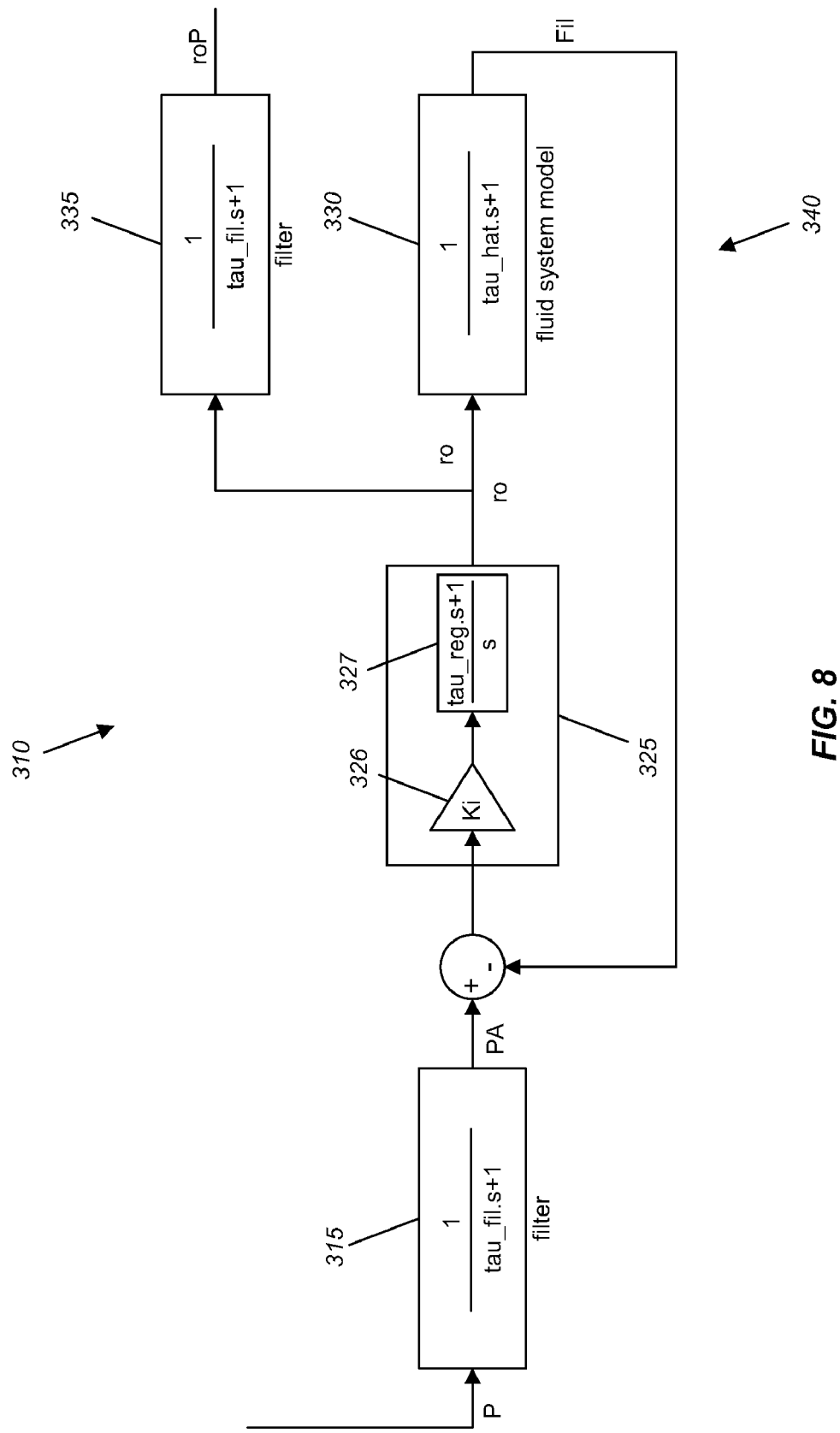
FIG. 8 is a flow diagram illustrating a model observer.

In another aspect of the controller 150, 150*a*, the microcontroller 185, 185*a* can include instructions that correspond to a model observer, such as the exemplary model observer 310 shown in FIG. 8. The model observer 310 includes a first filter 315, a regulator 325 having a variable gain 326 and a transfer function 327, a fluid system model 330 having a gain parameter (shown in FIG. 8 with the value of 1), and a second filter 335. In particular, the fluid system model 330 is configured to simulate the fluid-movement system 110. Additionally, the first filter 315 and the second filter 335 can include various types of analog and digital filters such as, but not limited to, low pass, high pass, band pass, anti-aliasing, IIR, and/or FIR filters.

It is to be understood that the model observer 310 is not limited to the elements described above. In other words, the model observer 310 may not necessarily include all the elements described above and/or may include other elements or combination of elements not explicitly described herein. In reference particularly to the fluid system model 330, a fluid system model may be defined utilizing various procedures. In some cases, a model may be generated for this particular aspect of the controller 150, 150*a* from another model corresponding to a simulation of another system, which may not necessarily be a fluid system. In other cases, a model may be generated solely based on controls knowledge of closed loop or feed back systems and formulas for fluid flow and power. In yet other cases, a model may be generated by experimentation with a prototype of the fluid system to be modeled.

In reference to the model observer 310 of FIG. 8, the first filter 315 receives a signal (P) corresponding to a parameter of the motor 145 determined and monitored by the microcontroller 185, 185*a* (e.g., input power, torque, current, power factor, etc.). Generally, the first filter 315 is configured to substantially eliminate the noise in the received signal (P), thus generating a filtered signal (PA). However, the first filter 315 may perform other functions such as anti-aliasing or filtering the received signal to a predetermined frequency range. The filtered signal (PA) enters a feed-back loop 340 of the model observer 310 and is processed by the regulator 325. The regulator 325 outputs a regulated signal (ro) related to the fluid flow and/or pressure through the fluid-movement system 110 based on the monitored parameter. The regulated signal can be interpreted as a modeled flow rate or modeled pressure. The fluid system model 330 processes the regulated signal (ro) to generate a model signal (Fil), which is compared to the filtered signal (PA) through the feed-back loop 340. The regulated signal (ro) is also fed to the second filter 335 generating a control signal (roP), which is subsequently used by the microcontroller 185, 185a to at least control the operation of the motor 145.

As shown in FIG. 8, the regulated signal (ro), indicative of fluid flow and/or pressure, is related to the monitored parameter as shown in equation [e2].

$$ro = (PA - Fil) * regulator \qquad [e2]$$

The relationship shown in equation [e2] allows a user to control the motor 145 based on a direct relationship between the input power or torque and a parameter of the fluid flow, such as flow rate and pressure, without having to directly measure the fluid flow parameter.

Figure 9:
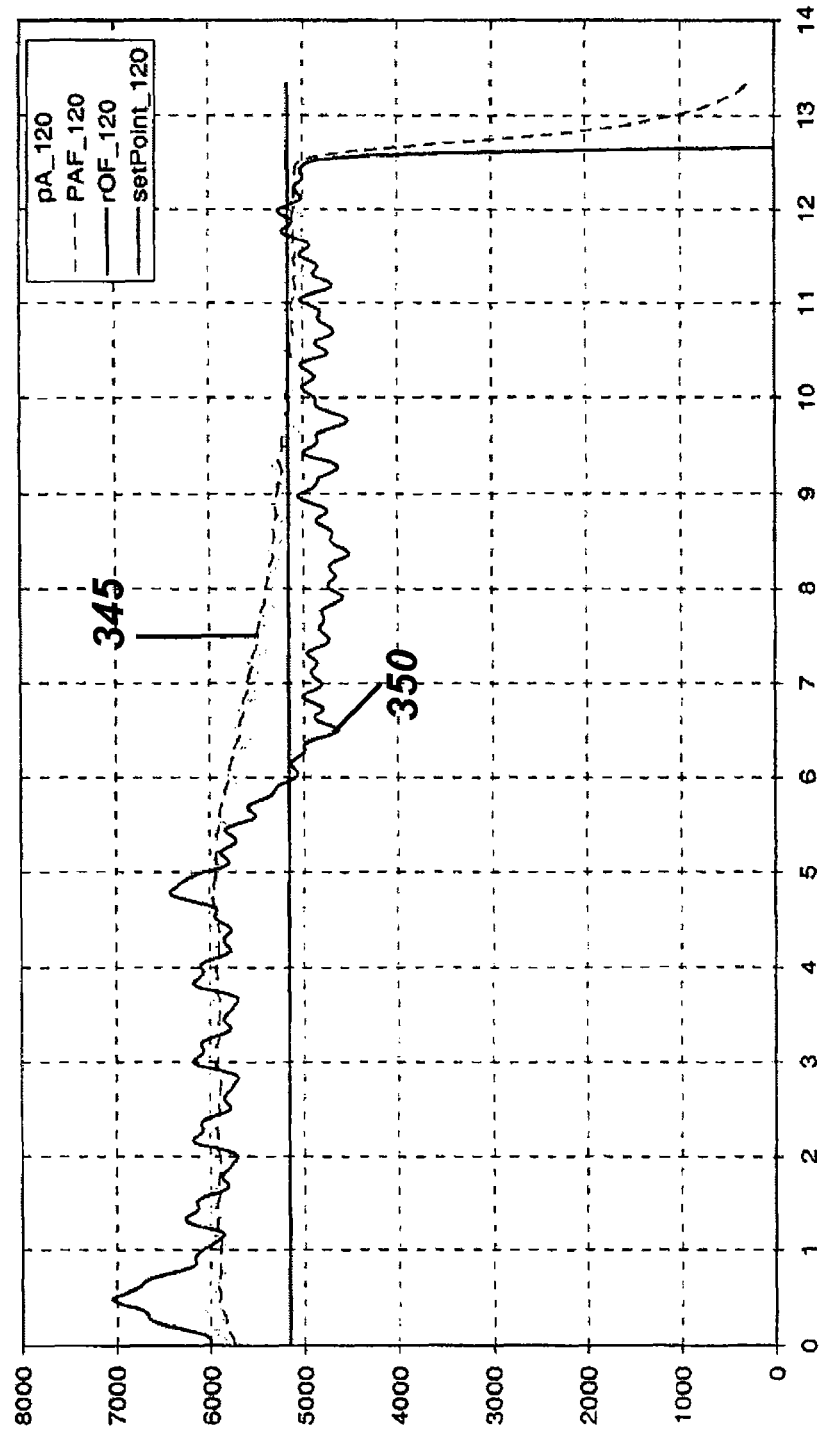
FIG. 9 is a graph showing an input power signal and a processed power signal as a function of time.

FIG. 9 is a graph showing an input power (line 345) and a processed power or flow unit (line 350) as functions of time. More specifically, the graph of FIG. 9 illustrates the operation of the fluid-movement system 110 with the motor 145 having a threshold value of 5000. For this particular example, FIG. 9 shows that the pump inlet 125 blocked at the 5-second mark. The input power drops below the threshold mark of 5000, and therefore the controller 150, 150a shuts down the pump 140 approximately at the 12.5-second mark. Alternatively, the processed power signal drops below the threshold mark corresponding to 5000 at the 6-second mark, and therefore the controller 150, 150a shuts down the pump 140 approximately at the 7-second mark.

In this particular example, the gain parameter of the fluid system model 330 is set to a value of 1, thereby measuring a unit of pressure with the same scale as the unit of power. In other examples, the user can set the gain parameter at a different value to at least control aspects of the operation of the motor 145, such as shut down time.

Figure 10:
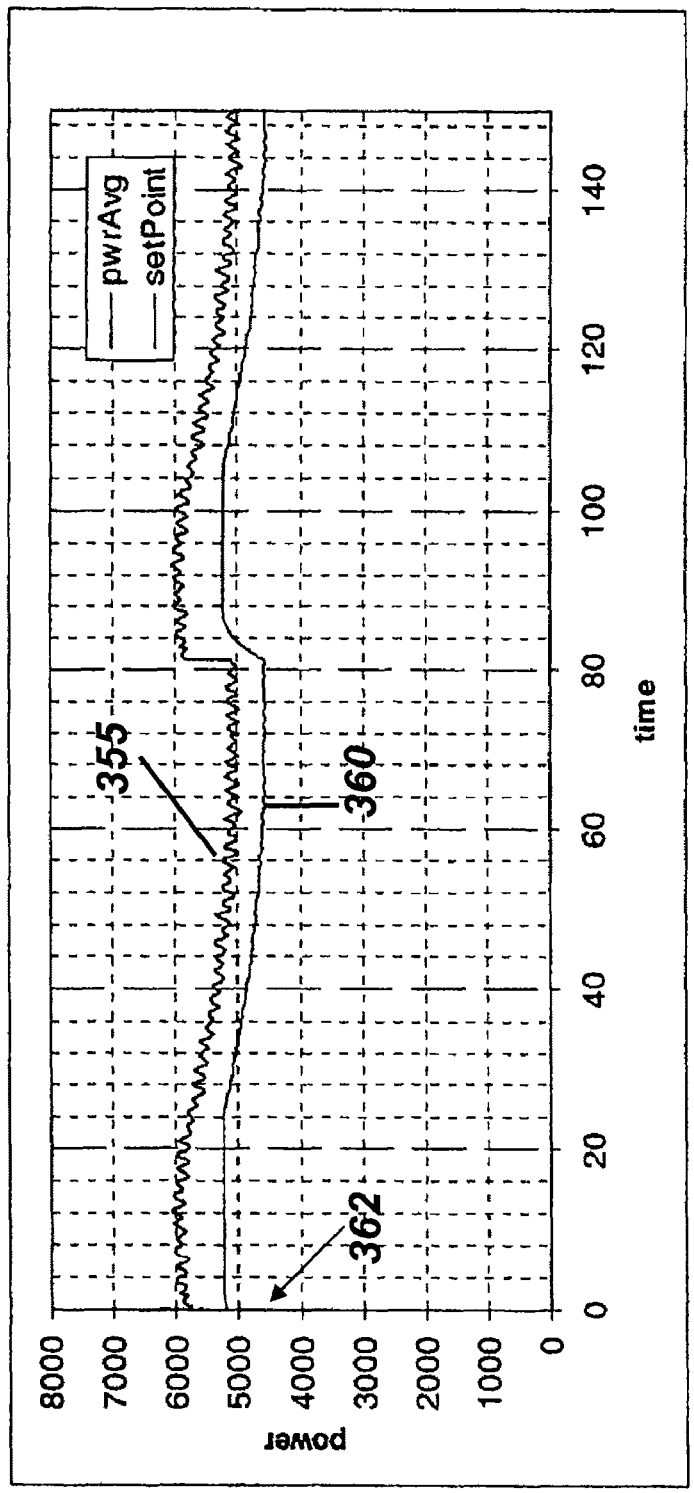
FIG. 10 is a graph showing an average input power signal and a threshold value reading as a function of time.

In another aspect of the controller 150, 150a, the microcontroller 185, 185a can be configured for determining a floating the threshold value or trip value indicating the parameter reading, such as input power or torque, at which the controller 150, 150a shuts down the pump 140. It is to be understood that the term "floating" refers to varying or adjusting a signal or value. In one example, the microcontroller 185, 185a continuously adjusts the trip value based on average input power readings, as shown in FIG. 10. More specifically, FIG. 10 shows a graph indicating an average input power signal (line 355) determined and monitored by the microcontroller 185, 185a, a trip signal (line 360) indicating a variable trip value, and a threshold value of about 4500 (shown in FIG. 10 with arrow 362) as a function of time. In this particular case, the threshold value 362 is a parameter indicating the minimum value that the trip value can be adjusted to.

The microcontroller 185, 185a may calculate the average input power 355 utilizing various methods. In one construction, the microcontroller 185, 185a may determine a running average based at least on signals generated by the current sense and average circuit 170, 170a and signals generated by the voltage sense and average circuit 165, 165a. In another construction, the microcontroller 185, 185a may determine an input power average over relatively short periods of time. As shown in FIG. 10, the average power determined by the microcontroller 185, 185a goes down from about 6000 to about 5000 in a substantially progressive manner over a time period of 80 units of time. It can also be observed that the signal 360 indicating the trip value is adjusted down to about 10% from the value at the 0-time unit mark to the 80-time unit mark and is substantially parallel to the average power 355. More specifically, the microcontroller 185, 185a adjusts the trip value based on monitoring the average input power 355.

In some cases, the average power signal 355 may define a behavior, such as the one shown in FIG. 10, due to sustained clogging of the fluid-movement system 110 over a period of time, for example from the 0-time unit mark to the 80-time unit mark. In other words, sustained clogging of the fluid-movement system 110 can be determined and monitored by the microcontroller 185, 185a in the form of the average power signal 355. In these cases, the microcontroller 185, 185a can also determine a percentage or value indicative of a minimum average input power allowed to be supplied to the motor 145, or a minimum allowed threshold value such as threshold value 362. When the fluid-movement system 110 is back-flushed with the purpose of unclogging the fluid-movement system 110, the average power signal 355 returns to normal unrestricted fluid flow (shown in FIG. 10 between about the 84-time unit mark and about the 92-time unit mark, for example). As shown in FIG. 10, unclogging the fluid-movement system 110 can result in relative desired fluid flow through the fluid-movement system 110. As a consequence, the microcontroller 185, 185a senses an average power change as indicated near the 80-time unit mark in FIG. 10 showing as the average power returns to the calibration value.

In other cases, the microcontroller 185, 185a can determine and monitor the average input power over a relatively short amount of time. For example, the microcontroller 185, 185a can monitor the average power over a first time period (e.g., 5 seconds). The controller 185, 185a can also determine a variable trip value based on a predetermine percentage (e.g., 6.25%) drop of the average power calculated over the first time period. In other words, the variable trip value is adjusted based on the predetermined percentage as the microcontroller 185, 185a determines the average power. The controller 150, 150a can shut down the pump 140 when the average power drops to a value substantially equal or lower than the variable trip value and sustains this condition over a second period of time (e.g., 1 second).

In another aspect of the controller 150, 150a, the microcontroller 185, 185a can be configured to determine a relationship between a parameter of the motor 145 (such as power or torque) and pressure/flow through the fluid-movement system 110 for a specific motor/pump combination. More specifically, the controller 150, 150a controls the motor 145 to calibrate the fluid-movement system 110 based on the environment in which the fluid-movement system 110 operates. The environment in which the fluid-movement system 110 operates can be defined by the capacity of the vessel 105, tubing configuration between the drain 115 and inlet 125, tubing configuration between outlet 130 and return 135 (shown in FIG. 1), number of drains and returns, and other factors not explicitly discussed herein.

Figure 11:
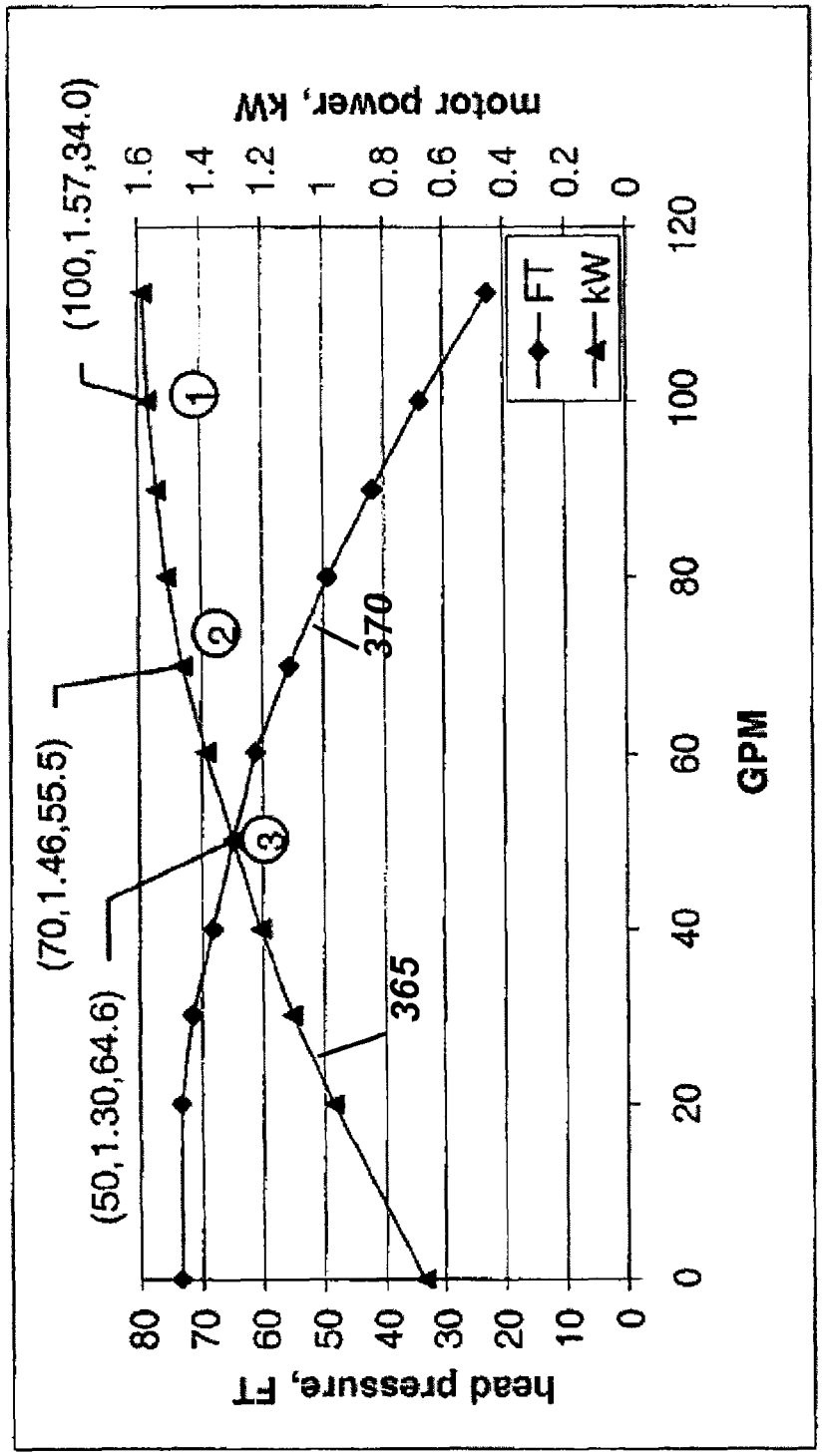
FIG. 11 is a graph showing characterization data and fluid pressure data as a function of flow rate.

Calibration of the fluid-movement system 110 is generally performed the first time the system is operated after installation. It is to be understood that the processes described herein are also applicable to recalibration procedures. In one example, calibration of the fluid-movement system 110 includes determining a threshold value based on characterizing a specific motor/pump combination and establishing a relationship between, for example, input power and pressure via a stored look-up table or an equation. FIG. 11 shows a chart having characterization data (line 365), measured in kilowatts and obtained through a calibration process, and a pump curve (line 370) indicating head pressure. The characterization data 365 and the pump curve 370 are graphed as a function of flow measured in gallons per minute (GPM). In the particular example shown in FIG. 11, it is possible for a user (or the microcontroller 185, 185a in an automated process) to establish a trip value based on a percent reduction in flow or pressure instead of a percent reduction in input power.

Referring particularly to the characterization data 365 shown in FIG. 11, if an operating point for the fluid-movement system 110 is determined at point 1 on the characterization data 365, a 30% reduction in flow from 100 GPM to 70 GPM (point 2 on the characterization data 365) through the fluid-movement system 110 is monitored by the microcontroller 185, 185a and indicates a 7% reduction in input power. For a different environment of the fluid-movement system 110, the operating set point can be established at point 2, for example. Particularly, a 30% reduction in flow from 70 GPM to 50 GPM (point 3 on the characterization data 365) through the fluid-movement system 110 is monitored by the microcontroller 185, 185a and indicates an 11% reduction in power. For the two cases described above, it is possible that a 30% reduction in flow is a desired operating condition, thus a user (or microcontroller 185, 185a) can establish a trip value or percentage based on the percent reduction (e.g., a reduction of 30% in flow) separate from the determined and monitored power.

In another aspect of the controller 150, 150a, the microcontroller 185, 185a can include a timer function to operate the fluid-movement system 110. In one example, the timer function of the microcontroller 185, 185a implements a RUN mode of the controller 150, 150a. More specifically regarding the RUN mode, the controller 150, 150a is configured to operate the motor 145 automatically over predetermined periods of time. In other words, the controller 150, 150a is configured to control the motor 145 based on predetermined time periods programmed in the microcontroller 185, 185a during manufacturing or programmed by a user. In another example, the timer function of the microcontroller 185, 185a implements an OFF mode of the controller 150, 150a. More specifically regarding the OFF mode, the controller 150, 150a is configured to operate the motor 145 only as a result of direct interaction of the user. In other words, the controller 150, 150a is configured to maintain the motor 145 off until a user directly operates the controller 150, 150a through the interface of the controller 150, 150a. In yet another example, the timer function of the microcontroller 185, 185a implements a PROGRAM mode of the controller 150, 150a. More specifically regarding the PROGRAM mode, the controller 150, 150a is configured to maintain the motor 145 off until the user actuates one of the switches (e.g., calibrate switch 195, 195a, clean mode switch 218a) of the controller 150, 150a indicating a desired one-time window of operation of the motor 145. For example, the user can actuate one switch three times indicating the controller 150, 150a to operate the motor 145 for a period of three hours. In some constructions, the controller 150, 150a includes a run-off-program switch to operate the controller 150, 150a between the RUN, OFF, and PROGRAM modes. It is to be understood that the same or other modes of operation of the controller 150, 150a can be defined differently. Additionally, not all modes described above are necessary and the controller 150, 150a can include a different number and combinations of modes of operation.

In another aspect of the controller 150, 150a, the microcontroller 185, 185a can be configured to determine and monitor a value corresponding to the torque of the motor 145. More specifically, the microcontroller 185, 185a receives signals from at least one of the voltage sense and average circuit 165, 165a and the current sense and average circuit 170, 170a to help determine the torque of the motor 145. As explained above, the microcontroller 185, 185a can also be configured to determine and monitor the speed of the motor 145, allowing the microcontroller 185, 185a to determine a value indicative of the torque of the motor 145 and a relationship between the torque and the input power. In some constructions, the speed of the motor 145 remains substantially constant during operation of the motor 145. In these particular cases, the microcontroller 185, 185a can include instructions related to formulas or look-up tables that indicate a direct relationship between the input power and the torque of the motor 145. Determining and monitoring the torque of the motor 145 allows the microcontroller 185, 185a to establish a trip value or a percentage based on torque to shut off the motor 145 in case of an undesired condition of the motor 145. For example, FIG. 12 shows a chart indicating a relationship between input power and torque for a motor 145 under the observation that the speed of the motor 145 changes less than 2%. Thus, the microcontroller 185, 185a can determine and monitor torque based on input power and under the assumption of constant speed.

In some constructions, the fluid-movement system 110 can operate two or more vessels 105. For example, the fluid-movement system 110 can include a piping system to control fluid flow to a pool, and a second piping system to control fluid flow to a spa. For this particular example, the flow requirements for the pool and the spa are generally different and may define or require separate settings of the controller 150, 150a for the controller 150, 150a to operate the motor 145 to control fluid flow to the pool, the spa, or both. The fluid-movement system 110 can include one or more valves that may be manually or automatically operated to direct fluid flow as desired. In an exemplary case where the fluid-movement system 110 includes one solenoid valve, a user can operate the valve to direct flow to one of the pool and the spa. Additionally, the controller 150, 150a can include a sensor or receiver coupled to the valve to determine the position of the valve. Under the above mentioned conditions, the controller 150, 150a can run a calibration sequence and determine individual settings and trip values for the fluid system including the pool, the spa, or both. Other constructions can include a different number of vessels 105, where fluid flow to the number of vessels 105 can be controller by one or more fluid-movement systems 110.

While numerous aspects of the controller 150, 150a were discussed above, not all of the aspects and features discussed above are required for the invention. Additionally, other aspects and features can be added to the controller 150, 150a shown in the figures.

The constructions described above and illustrated in the figures are presented by way of example only and are not intended as a limitation upon the concepts and principles of the invention. Various features and advantages of the invention are set forth in the following claims.

What is claimed is:

1. A method of controlling a motor operating a pumping apparatus of a jetted-fluid system comprising a vessel for holding a fluid, a drain, and a return, the pumping apparatus comprising a pump having an inlet connectable to the drain, and an outlet connectable to the return, the pump adapted to receive the fluid from the drain and jet fluid through the return, and the motor coupled to the pump to operate the pump, the method comprising:
   receiving a power parameter signal related to a power parameter of the motor;
   filtering the power parameter signal to generate a filtered power signal;
   comparing the filtered power signal to a fluid system model feedback signal;
   generating a fluid parameter signal based at least in part on the comparison of the filtered power signal to the fluid system model feedback signal, the fluid parameter signal being related to a fluid parameter of the jetted-fluid system;

generating the fluid system model feedback signal by providing the fluid parameter signal to a fluid system model;

generating a motor control signal having a correlation to a flow of the fluid through the jetted-fluid system based on the fluid parameter signal;

determining whether the motor control signal indicates a condition of the pump; and controlling the motor to operate the pump based on the condition of the pump.

2. The method of claim 1, wherein the condition of the pump is a suction entrapment condition.

3. The method of claim 1, wherein the fluid system model simulates at least a portion of the jetted-fluid system.

4. The method of claim 1, further comprising:
determining a trip value; and
comparing the motor control signal with the trip value.

5. A method of controlling a motor operating a pumping apparatus of a jetted-fluid system comprising a vessel for holding a fluid, a drain, and a return, the pumping apparatus comprising a pump having an inlet connectable to the drain, and an outlet connectable to the return, the pump adapted to receive the fluid from the drain and jet fluid through the return, and the motor coupled to the pump to operate the pump, the method comprising:

receiving a power parameter signal related to a power parameter of the motor;

filtering the power parameter signal to generate a filtered power signal;

comparing the filtered power signal to a fluid system model feedback signal;

generating a fluid parameter signal based at least in part on the comparison of the filtered power signal to the fluid system model feedback signal, the fluid parameter signal being related to a fluid parameter of the jetted-fluid system;

generating the fluid system model feedback signal by providing the fluid parameter signal to a fluid system model;

generating a motor control signal having a correlation to a fluid pressure within the jetted-fluid system based on the fluid parameter signal;

determining whether the motor control signal indicates a condition of the pump; and controlling the motor to operate the pump based on the condition of the pump.

6. The method of claim 5, wherein the condition of the pump is a suction entrapment event.

7. The method of claim 5, wherein the fluid system model simulates at least a portion of the jetted-fluid system.

8. The method of claim 5, further comprising:
determining a trip value; and
comparing the motor control signal with the trip value.

* * * * *